(12) United States Patent
Kitahara et al.

(10) Patent No.: US 10,547,912 B2
(45) Date of Patent: Jan. 28, 2020

(54) INFORMATION PROCESSING APPARATUS, BROADCAST APPARATUS, AND RECEIVING METHOD

(71) Applicant: SONY CORPORATION, Tokyo (JP)

(72) Inventors: Jun Kitahara, Shizuoka (JP); Naohisa Kitazato, Tokyo (JP); Yoshiharu Dewa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/917,492

(22) PCT Filed: Oct. 16, 2014

(86) PCT No.: PCT/JP2014/005262
§ 371 (c)(1),
(2) Date: Mar. 8, 2016

(87) PCT Pub. No.: WO2015/083315
PCT Pub. Date: Jun. 11, 2015

(65) Prior Publication Data
US 2016/0219347 A1     Jul. 28, 2016

(30) Foreign Application Priority Data
Dec. 5, 2013   (JP) ................................. 2013-252445

(51) Int. Cl.
*H04N 21/81* (2011.01)
*H04N 21/254* (2011.01)
(Continued)

(52) U.S. Cl.
CPC ..... *H04N 21/8173* (2013.01); *H04N 21/2541* (2013.01); *H04N 21/26613* (2013.01);
(Continued)

(58) Field of Classification Search
CPC ......... H04N 21/23617; H04N 21/2362; H04N 21/2541; H04N 21/26613; H04N 21/4622;
(Continued)

(56) References Cited

U.S. PATENT DOCUMENTS

2006/0193597 A1*  8/2006  Horii ...................... H04H 20/42
                                                          386/241
2008/0141323 A1*  6/2008  Munetsugu ......... H04L 12/2805
                                                          725/115
(Continued)

FOREIGN PATENT DOCUMENTS

EP          2 479 987 A1       7/2012
JP   WO 2012105523 A1 *  8/2012  ............. H04H 60/13
(Continued)

OTHER PUBLICATIONS

"Integrated Broadcast-Broadband System Specification IPTVFJ STD-0010 Version 1.0" IPTV Forum Japan, Mar. 22, 2013, 118 Pages.
(Continued)

*Primary Examiner* — Nasser M Goodarzi
*Assistant Examiner* — Jaycee Imperial
(74) *Attorney, Agent, or Firm* — Oblon, McClelland, Maier & Neustadt, L.L.P.

(57) ABSTRACT

There is provided an information processing apparatus including a broadcast receiving unit and a controller. The broadcast receiving unit is configured to be capable of receiving a broadcast. The controller is configured to acquire a first application information table by communication, the first application information table storing at least first usage permission information indicating a usage permission range of a resource of the broadcast by an application using the resource, to control an operation of the application, and to acquire a second application information table storing at
(Continued)

least second usage permission information indicating the usage permission range of the resource by the application by using the broadcast receiving unit during execution of the application, to control the operation of the application.

17 Claims, 23 Drawing Sheets

(51) Int. Cl.
   *H04N 21/266*  (2011.01)
   *H04N 21/462*  (2011.01)
   *H04N 21/4627* (2011.01)
   *H04N 21/478*  (2011.01)

(52) U.S. Cl.
   CPC ..... *H04N 21/4622* (2013.01); *H04N 21/4627* (2013.01); *H04N 21/478* (2013.01)

(58) Field of Classification Search
   CPC ............. H04N 21/4627; H04N 21/478; H04N 21/631; H04N 21/8173
   USPC .......................................................... 725/28
   See application file for complete search history.

(56) References Cited

U.S. PATENT DOCUMENTS

| | | | |
|---|---|---|---|
| 2012/0174170 A1 | 7/2012 | Dewa et al. | |
| 2013/0312059 A1* | 11/2013 | Otsuki | H04H 60/13 726/1 |
| 2014/0173665 A1 | 6/2014 | Kitazato et al. | |
| 2014/0214967 A1* | 7/2014 | Baba | H04N 7/173 709/205 |
| 2014/0304732 A1* | 10/2014 | Mitsuya | H04N 21/2362 725/32 |
| 2014/0344846 A1* | 11/2014 | Yamamura | H04N 21/2396 725/25 |
| 2014/0344883 A1 | 11/2014 | Kitazato et al. | |

FOREIGN PATENT DOCUMENTS

| | | | | |
|---|---|---|---|---|
| JP | WO 2012157741 A1 * | 11/2012 | ......... | H04N 21/2362 |
| JP | WO 2013031556 A1 * | 3/2013 | ............ | H04N 7/173 |
| JP | 2013-150089 A | 8/2013 | | |
| WO | WO-2012161125 A1 * | 11/2012 | ......... | H04N 21/2396 |
| WO | 2013/080450 A1 | 6/2013 | | |
| WO | WO 2013/094110 A1 | 6/2013 | | |
| WO | 2013/157446 A1 | 10/2013 | | |
| WO | 2013/168581 A1 | 11/2013 | | |

OTHER PUBLICATIONS

"HTML5 Browser Specification IPTVFJ STD-0011 Version 1.0" IPTV Forum Japan, Mar. 22, 2013, 85 Pages.
International Search Report dated Jan. 20, 2015 in PCT/JP2014/005262 filed on Oct. 16, 2014.
"Digital Video Broadcasting (DVB); Signaling and carriage of interactive applications and services in Hybrid broadcast/broadband environments" ETSI TS 102 809, V1.2.1, XP014156967, 2013, 98 pages.
"Hybrid Broadcast Broadband TV" ETSI TS 102 796, V1.2.1, XP014092699, 2012, 88 pages.
"Hybrid Broadcast Broadband TV" ETSI TS 102 796, V1.1.1, 2010, 75 pages.
Japanese Office Action dated Feb. 21, 2017 in Patent Application No. 2013-252445 (without English Translation).
Japanese Office Action dated May 16, 2017 in Patent Application No. 2013-252445 (with English Translation).
Office Action dated Nov. 13, 2018 in corresponding Japanese Patent Application No. 2017-178822 (with English Translation), 8 pages.
Office Action dated Aug. 7, 2018 in corresponding Japanese Patent Application No. 2017-178822 (with English Translation), 8 pages.
Japanese Office Action dated Feb. 12, 2019 in Japanese Application No. 2017-178822 (with corresponding partial English translation), 3 pages.
Japanese Office Action dated Feb. 12, 2019 in Japanese Application No. 2017-178822 (with corresponding partial English translation), 5 pages.
European Office Action dated Mar. 20, 2019 in European Application No. 14 799 222.6, 8 pages.

\* cited by examiner

| field | Description |
|---|---|
| appName | Application name |
| applicationId | Application identifier |
| applicationDescriptor | Application descriptor |
| type | Application type |
| controlCode | Control code instructing activation, termination, etc. of application |
| visibility | Specify visibility or invisibility of application |
| serviceBound | Flag indicating whether application is associated with service |
| priority | Priority of application |
| version | Version of application |
| icon | Icon information |
| storageCapability | Information for receiving apparatus to store or cache application |
| applicationTransport | Specify HTTPTransportType |
| applicationLocation | URL indicating location of application |
| applicationBoundary | Boundary information of application |
| applicationSpecificDescriptor | Information depending on application type |
| applicationUsageDescriptor | Kind of application (EPG etc.) |
| broadcastResourcePermissionDescriptor | Usage permission information descriptor |

FIG.2

| Element/Attribute | Number of appearances | Definition |
|---|---|---|
| Service_permission | 1..n | |
| @scope | 1 | Permission specifying unit "all","affiliate", "broadcaster","service","event","series" |
| @network_id | 0..1 | Network ID |
| @transport_stream_id | 0..1 | Transport stream ID |
| @service_id | 0..1 | Service ID |
| @event_id | 0..1 | Event ID |
| @series_id | 0..1 | Series ID |
| @affiliation_id | 0..1 | Affiliation ID |
| @broadcaster_id | 0..1 | Broadcaster ID |
| permission | 1 | Permission bitmap |
| Overlay_Permission_error_behaviour | 0..1 | Behavior in permission error "app_off","video-off","app_suspend" |
| Overlay_area | 0..1 | Screen area of overlay display by application |
| area | n | |
| @areaId | 1 | Area ID |
| @elementId | 0..1 | ID of element in HTML application |
| @upper_left_horizontal | 0..1 | Upper left horizontal coordinate of area (pixel) |
| @upper_left_vertical | 0..1 | Upper left vertical coordinate of area (pixel) |
| @horizontal_size | 0..1 | Horizontal size of area |
| @vertical_size | 0..1 | Vertical size of area |

FIG.3

| Data structure | Bit number | Bit string notation |
|---|---|---|
| application_information_section() { | | |
|    table_id | 8 | uimsbf |
|    section_syntax_indicator | 1 | bslbf |
|    reserved_future_use | 1 | bslbf |
|    reserved | 2 | bslbf |
|    section_length | 12 | uimsbf |
|    application_type | 16 | uimsbf |
|    reserved | 2 | bslbf |
|    version_number | 5 | uimsbf |
|    current_next_indicator | 1 | bslbf |
|    section_number | 8 | uimsbf |
|    last_section_number | 8 | uimsbf |
|    reserved_future_use | 4 | bslbf |
|    common_descriptors_length | 12 | uimsbf |
|    for(i=0;i<N;i++){ | | |
|      descriptor() | | |
|    } | | |
|    reserved_future_use | 4 | bslbf |
|    application_loop_length | 12 | uimsbf |
|    for(i=0;i<N;i++){ | | |
|      application_identifier() | | |
|      application_control_code | 8 | uimsbf |
|      reserved_future_use | 4 | bslbf |
|      application_descriptors_loop_length | 12 | uimsbf |
|      for(j=0;j<M;j++){ | | |
|        descriptor() | | |
|      } | | |
|    } | | |
|    CRC_32 | 32 | rpchof |
| } | | |

FIG.4

| Data structure | Bit number | Bit string notation |
|---|---|---|
| External_application_control_descriptor(){ | | |
|   descriptor_tag | 8 | uimsbf |
|   descriptor_length | 8 | uimsbf |
|   permission_bitmap_count | 8 | |
|   for(i=0;i<permission_bitmap_count;i++){ | | |
|     permission_bitmap | | |
|   } | 8 | |
|   overlay_admission_polarity | 1 | |
|   overlay_controlled_area_count | 4 | |
|   reserved | 3 | |
|   for(i=0;i<overlay_controlled_area_count;i++) | | |
|     overlay_controlled_area_tag | 8 | |
|     upper_left_horizontal | 8 | |
|     upper_left_vertical | 8 | |
|     horizontal_size | 8 | |
|     vertical_size | 8 | |
|   } | | |
|   bw_application_list_count | | |
|   for(i=0;i<bw_application_list_count;j++) | | |
|     application_identifier() | 48 | |
|     black_white_polarity | 1 | |
|     reserved | 7 | |
|   } | | |
| } | | |

| Code | Identification name | Meaning |
|---|---|---|
| 0x00 | | reserved_future_use |
| 0x01 | AUTOSTART | When service is selected, application is automatically activated (except for case where application is already in execution). |
| 0x02 | PRESENT | While service is being selected, application is in executable state but is not automatically activated. |
| 0x03 | DESTROY | Application terminates processing. |
| 0x04 | KILL | Application immediately terminates processing. |
| 0x05 | PREFETCH | Application file group is cached if receiving apparatus is available. Application is not started. |
| 0x06 | REMOTE | Application is not in current transport stream and can be acquired when channel of different stream is selected. |
| 0x07 | DISABLED | Application is disabled. |
| 0x08 | PLAYBACK_AUTOSTART | When receiving apparatus executes reproduction from storage device, application is activated as in AUTOSTART |
| 0x09 to 0xFF | | reserved_future_use |

FIG.6

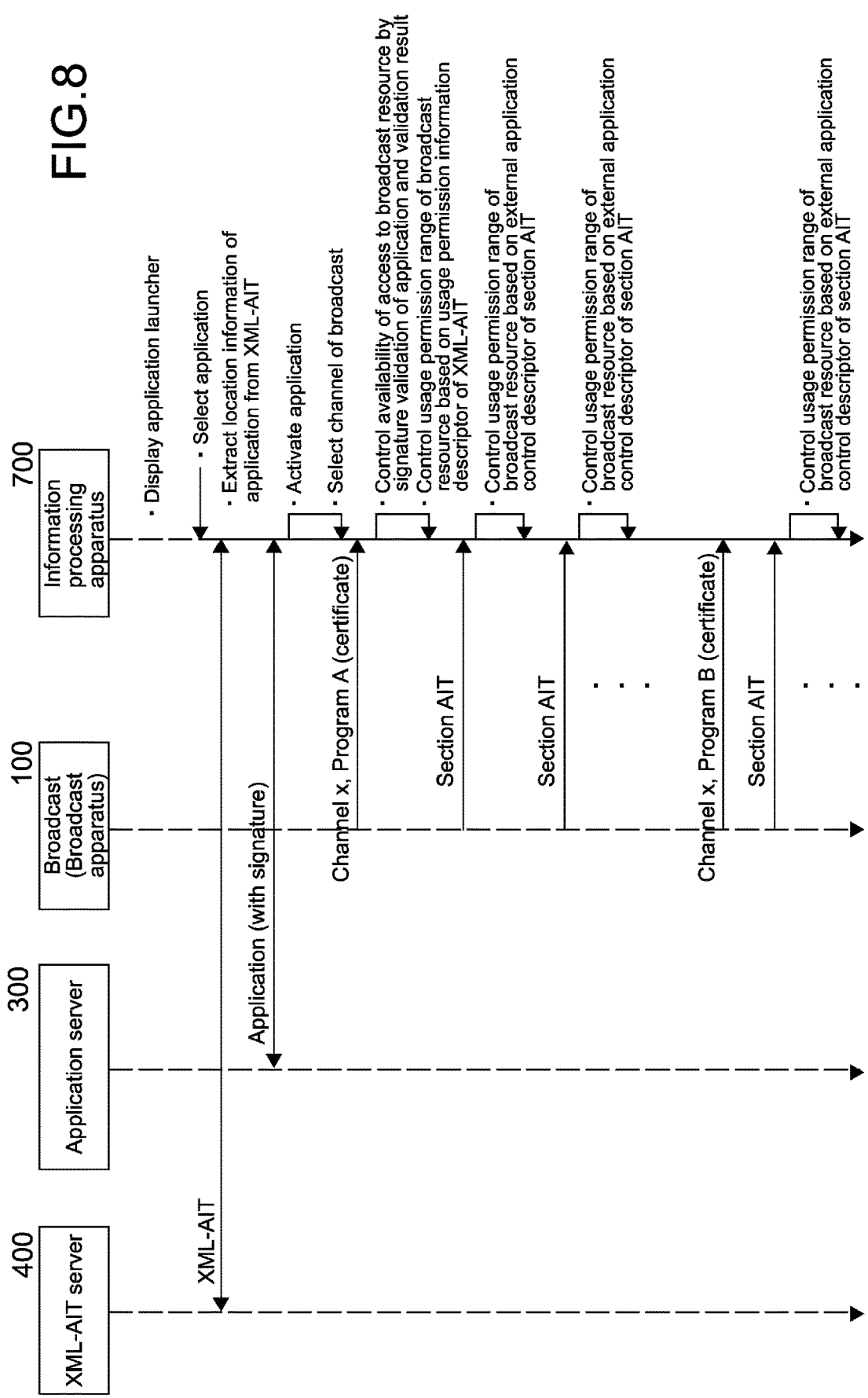

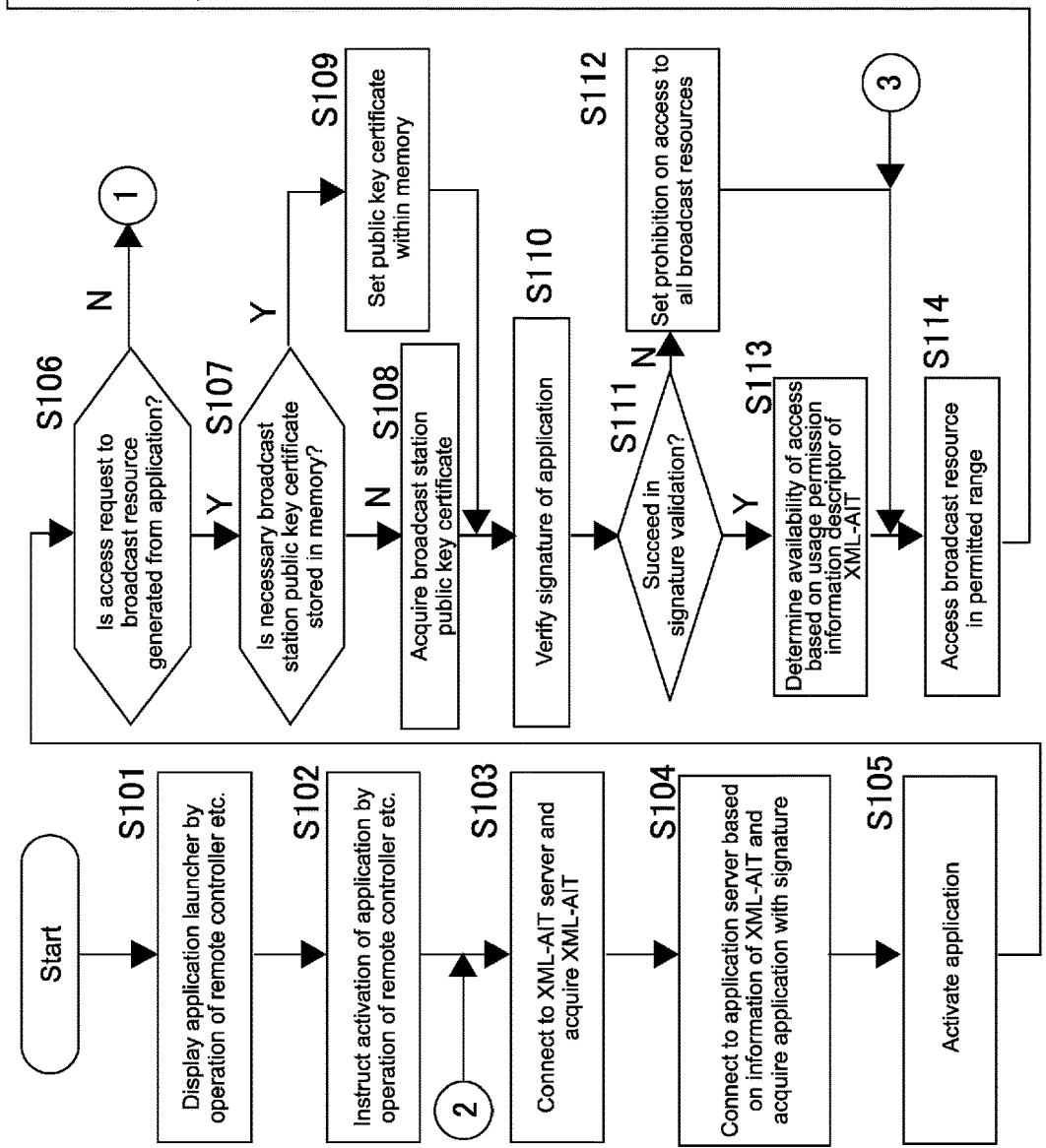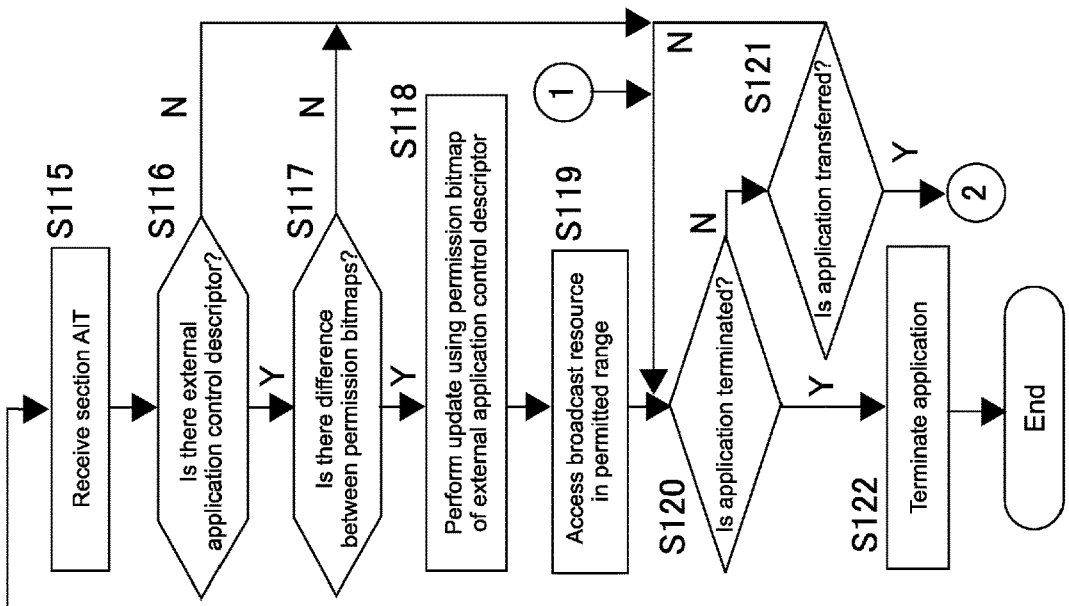

FIG.13
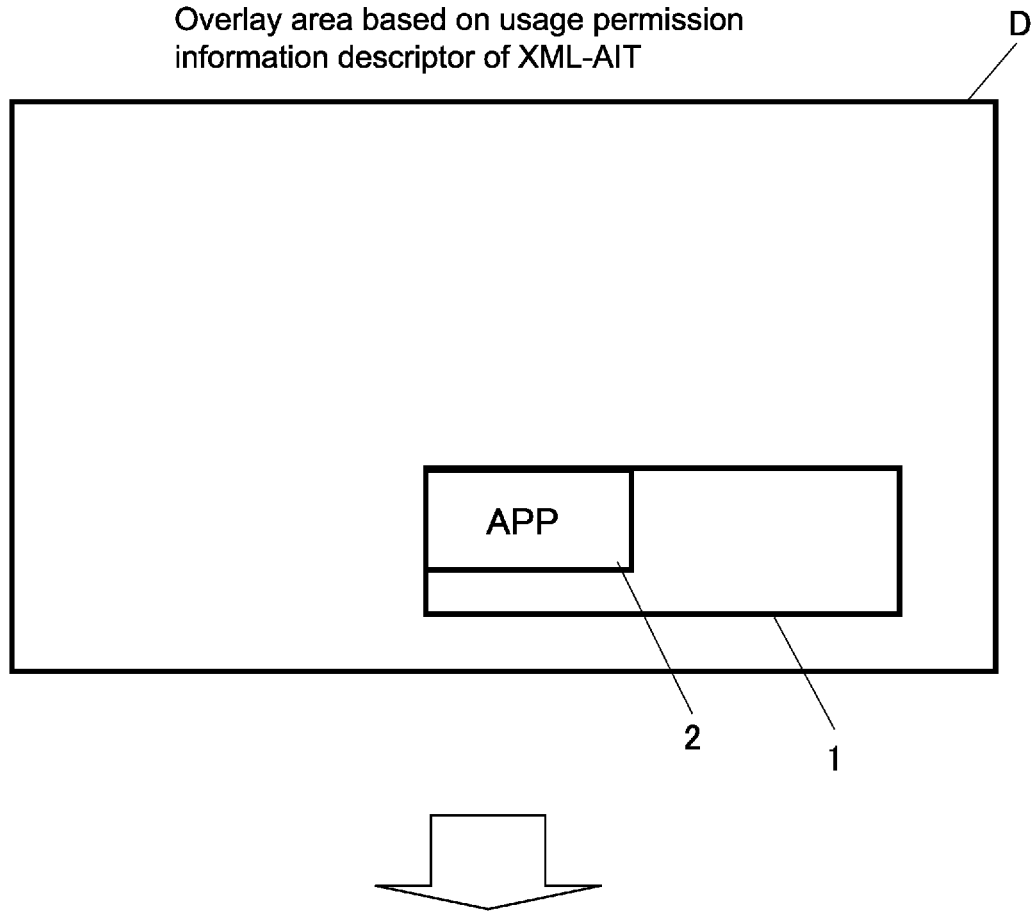
Overlay area based on usage permission information descriptor of XML-AIT
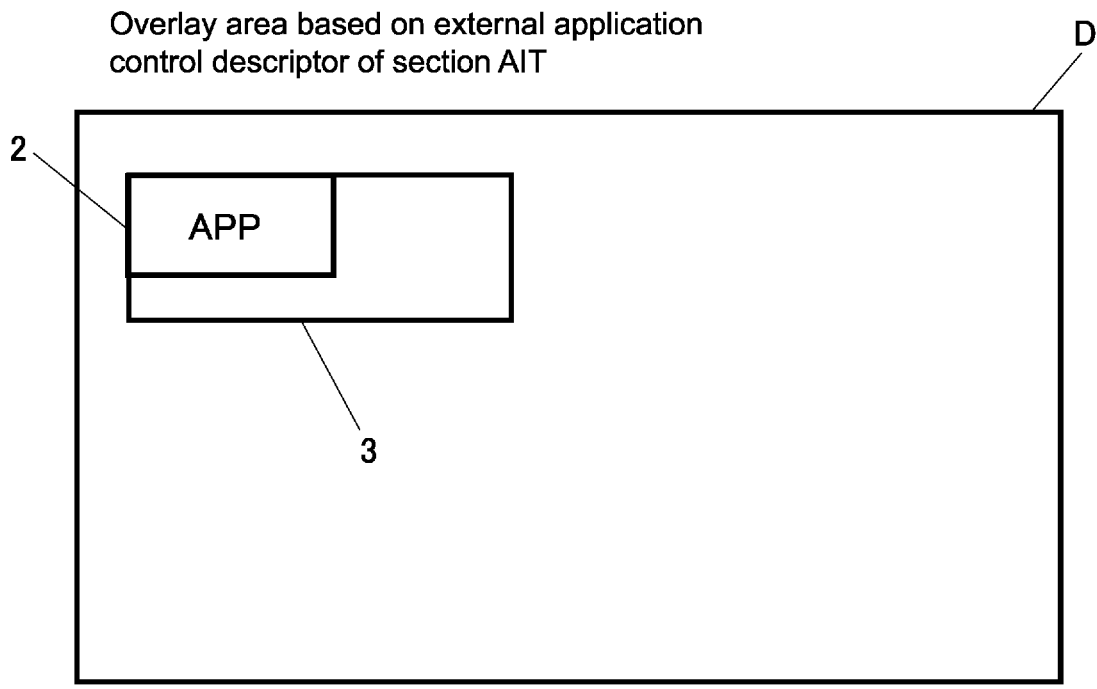
Overlay area based on external application control descriptor of section AIT FIG.14
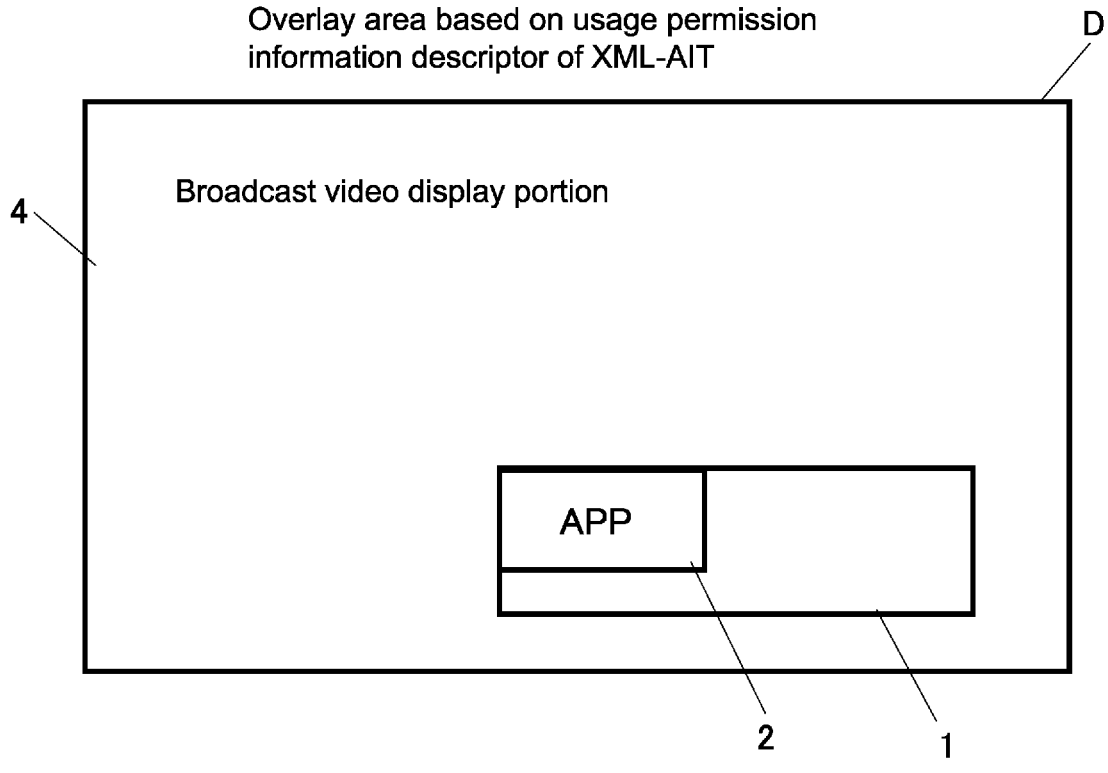
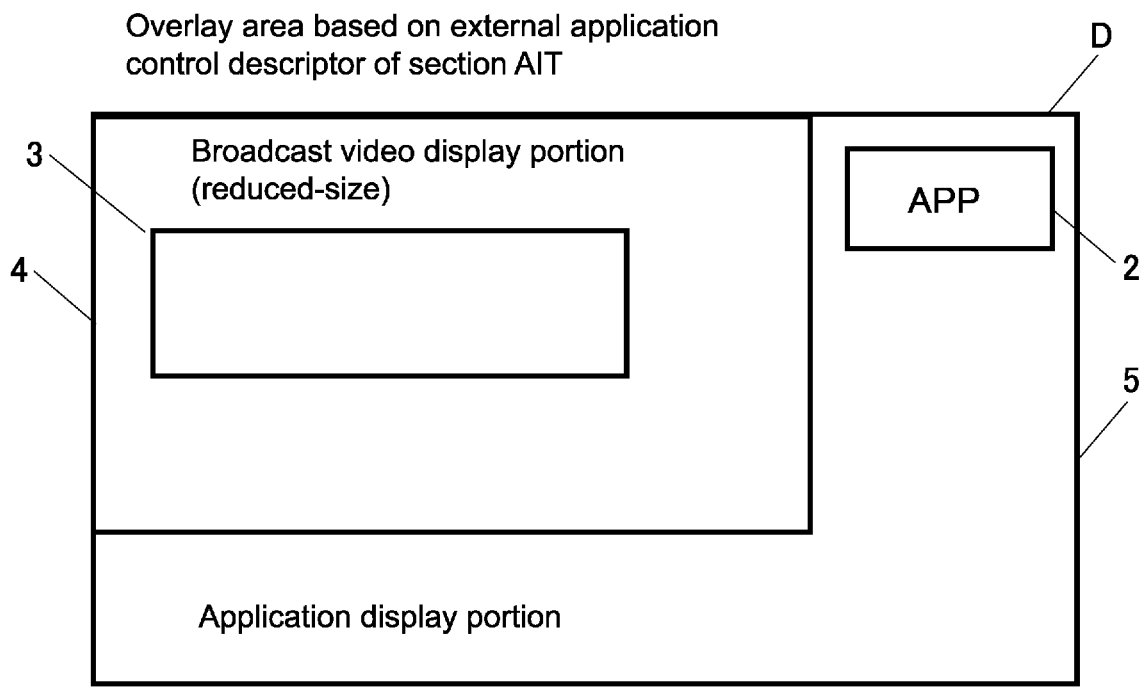

FIG.15
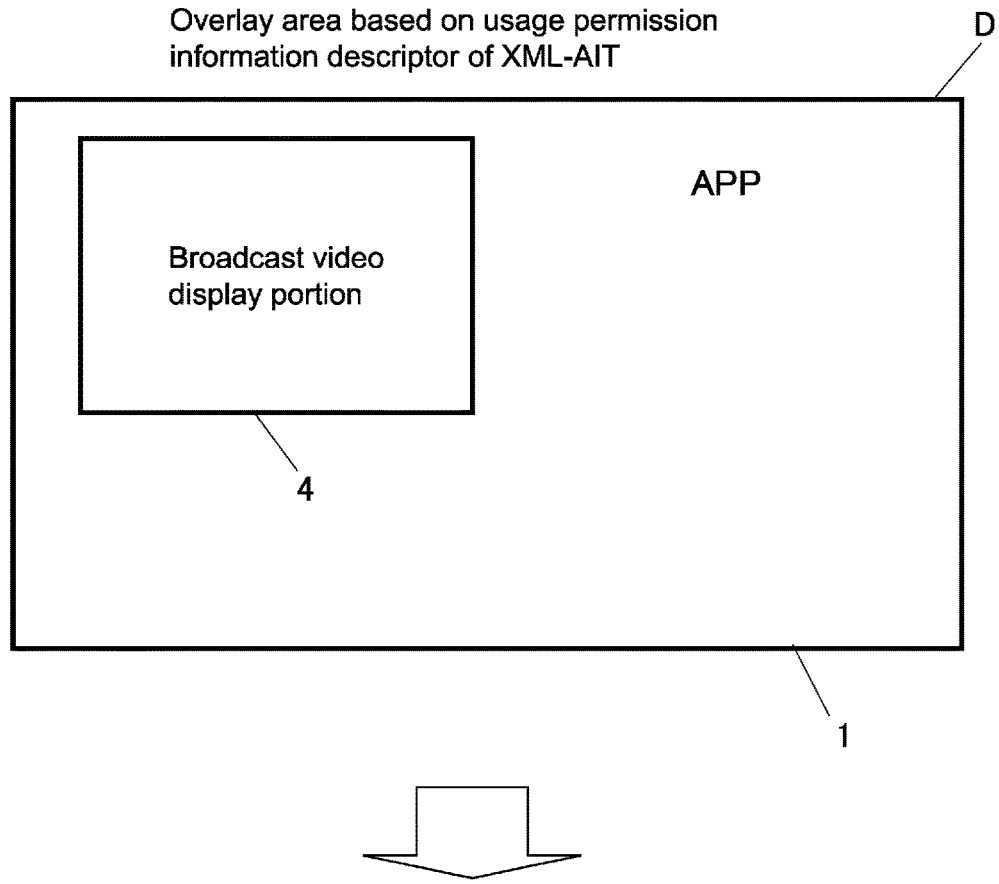
Overlay area based on usage permission information descriptor of XML-AIT
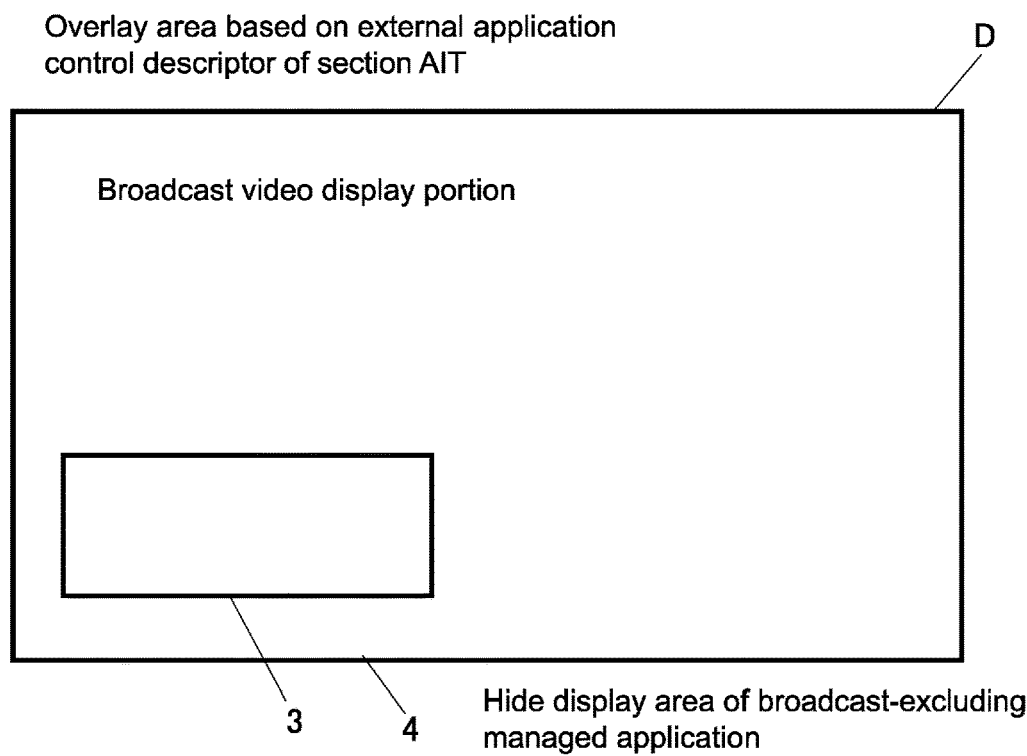
Overlay area based on external application control descriptor of section AIT
Hide display area of broadcast-excluding managed application

| Data structure | Bit number | Bit string notation |
|---|---|---|
| broadcast certificate_descriptor { | | |
|     descriptor_tag | 8 | uimsbf |
|     descriptor_length | 8 | uimsbf |
|     broadcaster_certificate_id | 16 | uimsbf |
|     broadcaster_certificate_version | 16 | uimsbf |
| } | | |

| Data structure | Bit number | Bit string notation |
|---|---|---|
| root_certificate_descriptor { | | |
|    descriptor_tag | 8 | uimsbf |
|    descriptor_length | 8 | uimsbf |
|    root_certificate_type | 1 | bslbf |
|    reserved | 7 | bslbf |
|    if( root_certificate_type == 0) { | | |
|       for( i=0; i<8; i++ ) { | | |
|          root_certificate_id | 32 | uimsbf |
|          root_certificate_version | 32 | uimsbf |
|       } | | |
|    } else if( root_certificate_type == 2 ) { | | |
|       for( i=0; i<8; i++ ) { | | |
|          broadcaster_certificate_id | 32 | uimsbf |
|          broadcaster_certificate_version | 32 | uimsbf |
|       } | | |
|    } else { | | |
|       for( i=0; i<8; i++ ) { | | |
|          reserved | 64 | bslbf |
|       } | | |
|    } | | |
| } | | |

FIG.20

| Data structure | Bit number | Bit string notation |
|---|---|---|
| root_certificate_descriptor { | | |
|   descriptor_tag | 8 | uimsbf |
|   descriptor_length | 8 | uimsbf |
|   root_certificate_type | 1 | bslbf |
|   broadcaster_certificate_flag | 1 | bslbf |
|   reserved | 6 | bslbf |
|   if( root_certificate_type == 0) { | | |
|     for( i=0; i<8; i++ ) { | | |
|       root_certificate_id | 32 | uimsbf |
|       root_certificate_version | 32 | uimsbf |
|     } | | |
|   } else { | | |
|     for( i=0; i<8; i++ ) { | | |
|       reserved | 64 | bslbf |
|     } | | |
|   } | | |
| } | | |

FIG.22

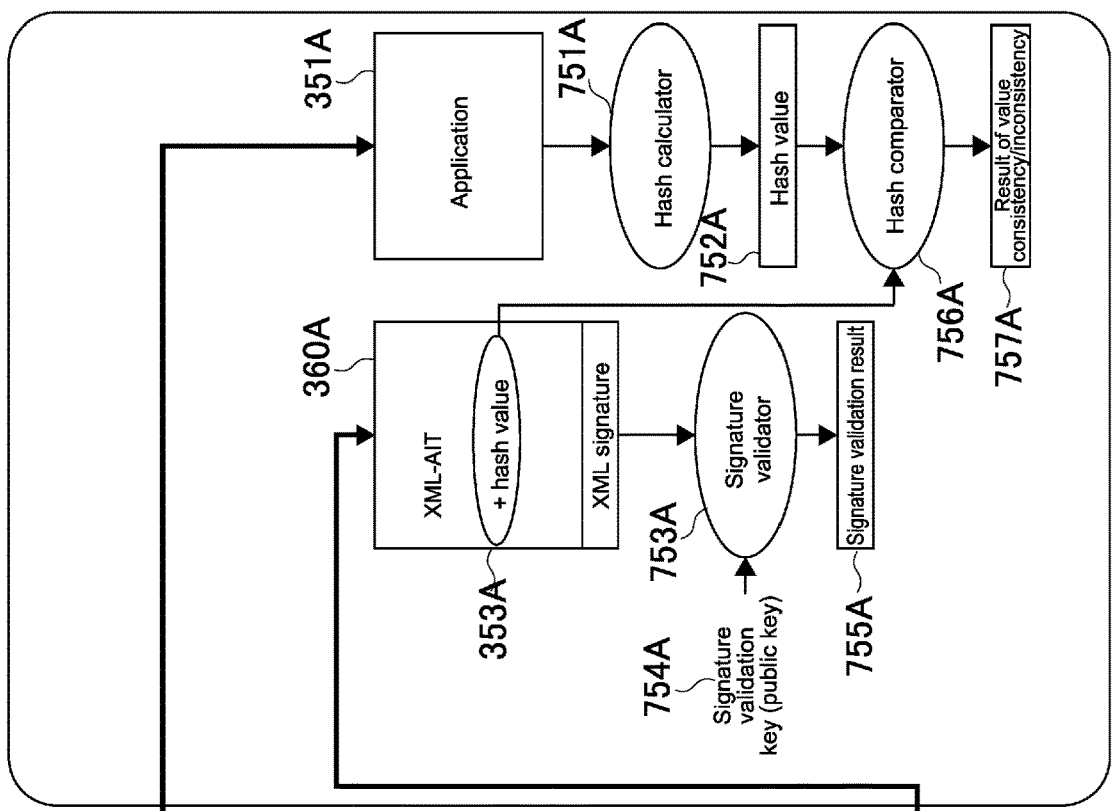
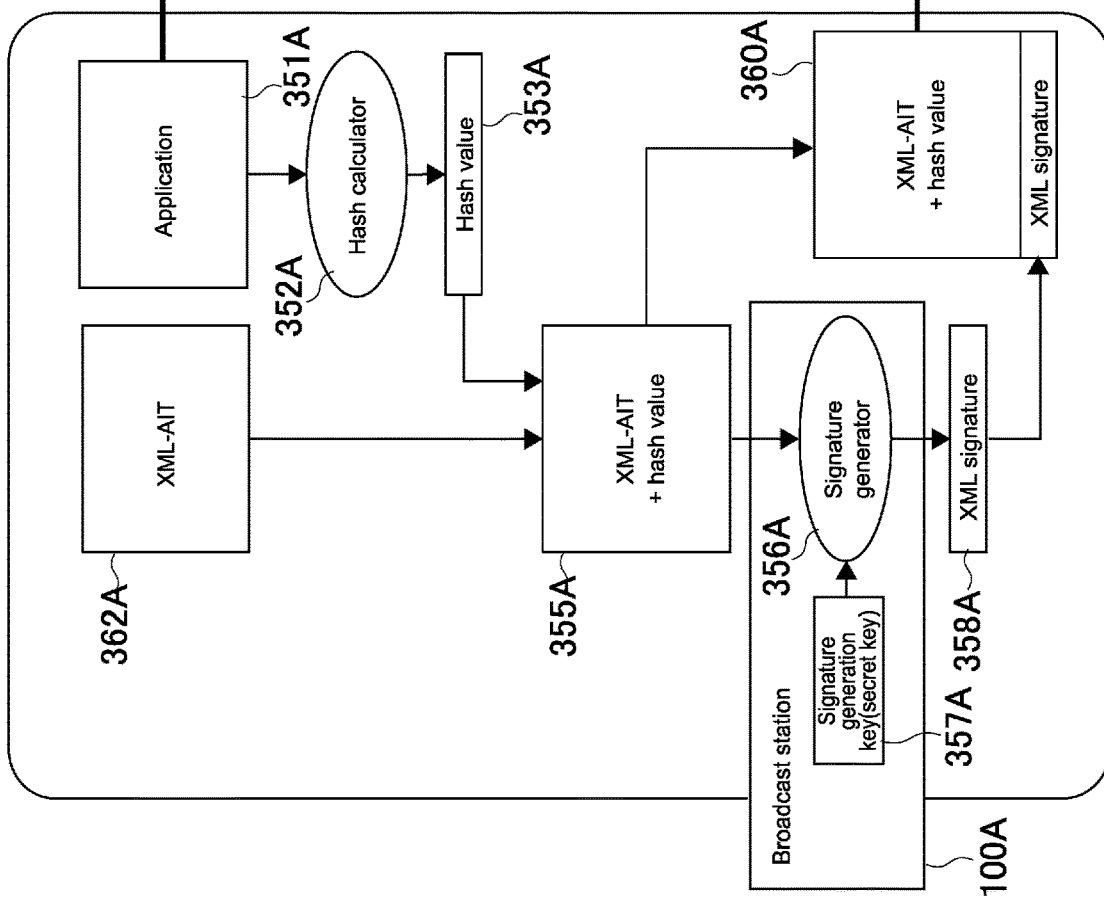
FIG. 24

INFORMATION PROCESSING APPARATUS, BROADCAST APPARATUS, AND RECEIVING METHOD

TECHNICAL FIELD

This application claims the benefit of Japanese Priority Patent Application JP 2013-252445 filed Dec. 5, 2013, the entire contents of which are incorporated herein by reference.

The present technology relates to an information processing apparatus capable of presenting broadcast content and also executing an application by using an application information table, a broadcast apparatus that transmits broadcast content received in such an information processing apparatus, and a receiving method by such an information processing apparatus.

BACKGROUND ART

Recently, there has been known a technology capable of executing an application delivered via a network such as the Internet simultaneously with the reproduction of broadcast content. As such a technology, a technology called Hybrid Broadcast Broadband TV (hereinafter, referred to as HbbTV) is known. As the standard of the HbbTV, "ETSI TS 102 796" (see Non-patent Literature 1) is developed in Europe. Additionally, also in Japan, standards "IPTVFJ STD-0010" (see Non-patent Literature 2) and "IPTVFJ STD-0011" (see Non-patent Literature 3) that correspond to the "ETSI TS 102 796" are developed.

For example, in a system in which an application is executed simultaneously with the reproduction of broadcast content, such as the HbbTV, a life cycle from the activation to the end of the application is managed by a data structure called AIT (Application Information Table) section that is superimposed on the broadcast content. An information terminal that has acquired an AIT section controls an application based on an application control code included in the AIT section.

Further, an XML-AIT that is described in an XML format is exemplified as a format that includes information equivalent to the broadcast AIT section and is optimal to provide information on an application to a receiving apparatus by using a communication network such as the Internet.

CITATION LIST

Non Patent Literature

NPL 1: ETSI (European Telecommunications Standards Institute), "ETSI TS 102 796 V1.1.1 (2010 June)",
NPL 2: IPTV FORUM JAPAN, "Integrated Broadcast-Broadband System Specification Version 1.0".
NPL 3: IPTV FORUM JAPAN, "IPTVFJ STD-0011 HTML5 Browser Specification Version 1.0".

SUMMARY

Technical Problem

In the future, it is assumed that providers other than broadcast stations, for example, application providers such as a manufacturer of a terminal and a third party provide applications using broadcast programs in some form. Hereinafter, such applications are referred to as "broadcast-excluding managed applications".

However, when a service using such a broadcast-excluding managed application is actually operated, various problems to be solved still remain, and countermeasures for them are expected.

In view of the circumstances as described above, it is desirable to provide an information processing apparatus, a broadcast apparatus, and a receiving method, in which a service provider can reflect limitations of a behavior of a broadcast-excluding managed application in details, to improve the quality of service.

Solution to Problem

According to an embodiment of the present technology, there is provided an information processing apparatus including: a broadcast receiving unit configured to be capable of receiving a broadcast; and a controller configured to acquire a first application information table by communication, the first application information table storing at least first usage permission information indicating a usage permission range of a resource of the broadcast by an application using the resource, to control an operation of the application, and to acquire a second application information table storing at least second usage permission information indicating the usage permission range of the resource by the application by using the broadcast receiving unit during execution of the application, to control the operation of the application.

The controller may be configured to acquire the application based on information of the first application information table and activate the acquired application.

When a difference is detected by comparing the first usage permission information with the second usage permission information, the controller may be configured to switch from the first usage permission information to the second usage permission information, to control a usage range of the resource by the application.

The application may include an application provided by a third party excluding a broadcast station.

In the information processing apparatus, each of the first application information table and the second application information table may be configured to store area information that defines an area on a display screen, the area allowing the application to be displayed therein, and the controller may be configured to set the area based on the area information and display the application in the area.

According to another embodiment of the present technology, there is provided a broadcast apparatus including a broadcast unit configured to transmit a broadcast signal containing an application information table, the application information table storing at least usage permission information indicating a usage permission range of a broadcast resource by an application capable of using the broadcast resource.

The broadcast unit may be configured to store area information in the application information table for transmission, the area information defining an area on a display screen, the area allowing the application to be displayed therein.

According to another embodiment of the present technology, there is provided a receiving method including: by a controller, acquiring a first application information table by communication, the first application information table storing at least first usage permission information indicating a usage permission range of a resource of a broadcast by an application using the resource, to control an operation of the application; and acquiring a second application information table from a broadcast during execution of the application, the second application information table storing at least second usage permission information indicating a usage permission range of the resource by the application, to control the operation of the application.

Advantageous Effects of Invention

As described above, according to the present technology, it is possible for a service provider to reflect limitations of a behavior of a broadcast-excluding managed application in details and thus to improve the quality of service.

BRIEF DESCRIPTION OF DRAWINGS

FIG. 2 is a diagram showing the data structure of an XML-AIT.

FIG. 3 is a diagram showing the syntax of a usage permission information descriptor.

FIG. 4 is a diagram showing the data structure of a section AIT.

FIG. 5 is a diagram showing the syntax of an external application control descriptor.

FIG. 6 is a diagram showing the definitions of application control codes.

FIG. 8 is a sequence diagram showing the flow of interaction among a broadcast station, an application server, an XML-AIT server, and an information processing apparatus.

FIG. 9 is a flowchart showing a processing procedure by an application controller of the information processing apparatus.

FIG. 13 is a diagram showing a first update example of an overlay area.

FIG. 14 is a diagram showing a second update example of an overlay area.

FIG. 15 is a diagram showing a third update example of an overlay area.

FIG. 20 is a diagram showing the configuration of a route certificate descriptor by a data broadcast extending system (Part 1).

FIG. 22 is a diagram showing the configuration of a route certificate descriptor by a data broadcast extending system (Part 2).

FIG. 24 is a diagram for describing a system of the generation and validation of an electronic signature and a hash value.

DESCRIPTION OF EMBODIMENTS

Hereinafter, an embodiment of the present technology will be described with reference to the drawings.

First Embodiment (Information Processing System)

Figure 1:
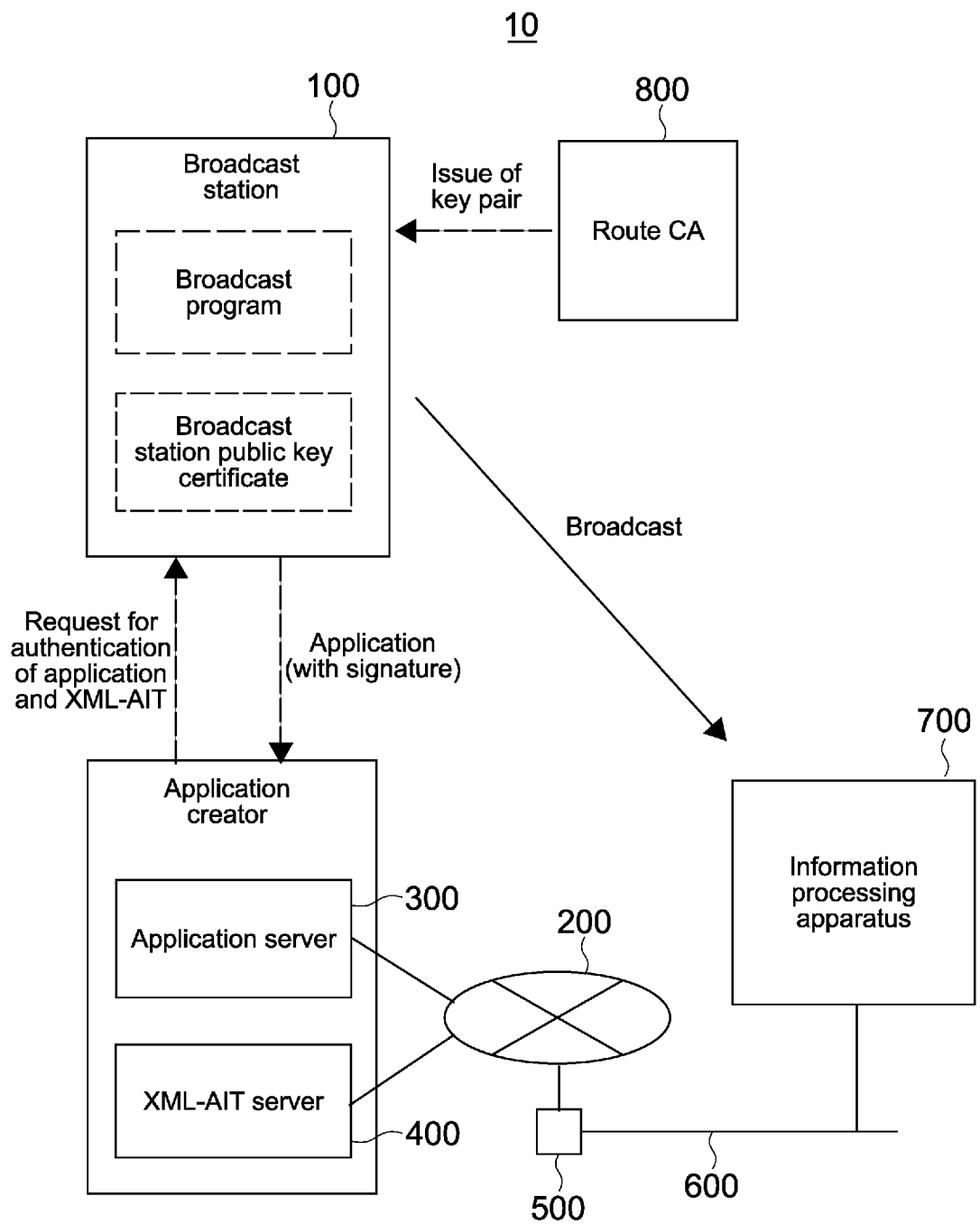
FIG. 1 is a diagram showing the general outline of an information processing system of this embodiment.

FIG. 1 is a diagram showing the configuration of an information processing system of this embodiment.

An information processing system 10 of this embodiment includes a broadcast station 100, a first network 200 such as the Internet, an application server 300, an XML-AIT server 400, an edge router 500, a second network 600 such as a LAN (Local Area Network), and an information processing apparatus 700 as a broadcast receiving apparatus.

The broadcast station 100 (broadcast apparatus) includes broadcast equipment (broadcast unit) that transmits a digital broadcast signal via, for example, communication media such as ground waves, satellite waves, and an IP (Internet Protocol) network. The broadcast station 100 sends an AV stream, into which transport streams of videos, voices, subtitles, and the like are multiplexed, and a so-called broadcast stream, on which data accompanying the AV stream and the like are superimposed. The data accompanying the AV stream includes markup languages such as HTML and BML, a broadcast managed application described in a scripting language such as a Java (registered trademark) script, an AIT (Application Information Table) in a section form for controlling operations of a broadcast managed application and a broadcast-excluding managed application, and the like. Hereinafter, the AIT is referred to as a "section AIT". The section AIT corresponds to a "second application information table" in the Claim section.

It should be noted that in this embodiment, the AV stream, into which transport streams of videos, voices, subtitles, and the like are multiplexed for transmission, is referred to as "broadcast content". The terminology "broadcast content" does not include either an application or a section AIT.

The application server 300 is capable of being connected to the first network 200 and provides an application, which is processed together with the broadcast content, to the information processing apparatus 700 via the first network 200. Here, the application provided from the application server 300 to the information processing apparatus 700, for instance, is referred to as a "broadcast-excluding managed application" and distinguished from a "broadcast managed application", which is an application supplied from the broadcast station 100 to the information processing apparatus 700, for instance.

It should be noted that the section AIT is originally information for controlling a broadcast managed application to operate in conjunction with broadcast content. In this embodiment, the syntax of the section AIT is defined such that the section AIT can also be used in control of the broadcast-excluding managed application. The syntax of the section AIT will be described later in detail.

The XML-AIT server 400 is capable of being connected to the first network 200 and delivers an XML (Extensible Markup Language)-AIT corresponding to a broadcast-excluding managed application, which is provided from the application server 300, to the information processing apparatus 700 via the first network 200, in response to a request from the information processing apparatus 700. The XML-AIT contains information for controlling at least the activation of the broadcast-excluding managed application. In contrast to this, the section AIT contains information for controlling an operation after the activation of the broadcast-excluding managed application, which is activated according to the XML-AIT. The XML-AIT corresponds to a "first application information table" in the Claim section.

It should be noted that the application server 300 and the XML-AIT server 400 may be one server. Each of the application server 300 and the XML-AIT server 400 includes a CPU (Central Processing Unit), a main memory, a data storage device, a user interface, and the like and has a configuration as a typical computer. The main memory or the data storage device stores a program for causing the computer described above to function as a table transmitting unit.

The edge router 500 is a router for connecting the first network 200 and the second network 600. The second network 600 may be wired or wireless.

The information processing apparatus 700 is, for example, a personal computer, a mobile phone, a smartphone, a television apparatus, a game device, a tablet terminal, an audio-video reproduction device, or the like, but a specific product form is not determined.

The information processing apparatus 700 receives a digital broadcast signal from the broadcast station 100 and modulates the digital broadcast signal to acquire a transport stream. The information processing apparatus 700 can separate a broadcast stream from the transport stream and decode the broadcast stream to be output to a display unit (not shown) and a speaker unit (not shown), or a recording apparatus (not shown) that are connected to the information processing apparatus 700.

It should be noted that each of the display unit, the speaker unit, and the recording apparatus may be incorporated in the information processing apparatus 700 or may be connected, as devices independent from one another, to the information processing apparatus 700 directly or via the second network 600. Alternatively, a device (not shown) including the display unit and the speaker unit may be connected to the information processing apparatus 700 directly or via the second network 600.

The information processing apparatus 700 acquires an XML-AIT from the XML-AIT server 400 and accesses the application server 300 based on location information described in the XML-AIT. The information processing apparatus 700 acquires a broadcast-excluding managed application, which is to be controlled by the XML-AIT, from the application server 300.

The information processing apparatus 700 extracts an application identifier of the broadcast-excluding managed application, which is to be controlled by the XML-AIT, from the acquired XML-AIT and extracts a section AIT having that application identifier from one or more section AITs that are multiplexed into the received transport stream. The information processing apparatus 700 controls the operation of the broadcast-excluding managed application that is already activated according to the section AIT.

(Application)

Next, applications such as a broadcast managed application and a broadcast-excluding managed application will be described. An application is provided from the broadcast station 100 and the application server 300 to the information processing apparatus 700. The application is constituted of, for example, an HTML (Hyper Text Markup Language) document, a BML (Broadcast Markup Language) document, an MHEG (Multimedia and Hypermedia information coding) document, a Java (registered trademark) script, a still-image file, and a moving-image file.

The application can have a visible state or an invisible state. The visible state refers to a state in which a user can view the operation of that application through a screen. The invisible state refers to a state in which a user is not allowed to view the operation of that application through a screen.

Further, the application may be a bi-directional-type application capable of changing information or a function to be presented according to an operation of the user of the information processing apparatus 700 or may be an application for uni-directionally presenting information to the user.

(Data Structure of XML-AIT)

Next, the data structure of an XML-AIT will be described.

FIG. 2 is a diagram showing the data structure of an XML-AIT of this embodiment.

The XML-AIT stores, for each application, an application name (appName), an application identifier (applicationId), an application descriptor (applicationDescriptor), a transport protocol descriptor (applicationTransport), an application location descriptor (applicationLocation), an application boundary descriptor (applicationBoundary), an application specific descriptor (applicationSpecificDescriptor), an application usage descriptor (applicationUsageDescriptor), a usage permission information descriptor 21 (broadcastResourcePermissionDescriptor), and the like.

The application descriptor stores an application type (type), an application control code (controlCode) 22, a flag specifying visibility or invisibility of an application (visibility), a flag indicating whether an application is associated with a service (serviceBound), a priority of an application (priority), a version of an application (version), icon information (icon), information for the information processing apparatus 700 to store or cache an application (storageCapability), and the like.

(Syntax of Usage Permission Information Descriptor)

The usage permission information descriptor 21 is a descriptor added in the case where the use of a broadcast resource is permitted to a broadcast-excluding managed application.

FIG. 3 is a diagram showing the syntax of the usage permission information descriptor 21.

In the usage permission information descriptor 21, one or more pieces of service usage permission information (Service_permission) and one or more pieces of overlay area information (Overlay_area) can be described.

The service usage permission information contains a permission specifying unit (scope) showing a range in which a usage permission is applied. The permission specifying unit includes the following items.

all: all broadcasters
    affiliate: affiliated station
    broadcaster: broadcaster
    service: channel
    event: program
    series: series In the case where the permission specifying unit is "affiliate", an affiliated station is specified by an affiliation ID (affiliation_id).

In the case where the permission specifying unit is "broadcaster", a broadcaster is specified by a broadcaster ID (broadcaster_id).

In the case where the permission specifying unit is "service", a channel is specified by a network ID (network_Id), a transport stream ID (transport_stream_id), and a service ID (service_id).

In the case where the permission specifying unit is "event", a program is specified by the network ID, the transport stream ID, the service ID, and an event IDj (event_id).

In the case where the permission specifying unit is "series", series are specified by the network ID, the transport stream ID, the service ID, and a series ID (series_id).

In the service usage permission information, a permission bitmap (permission) is further stored. The permission bitmap is binary data of the service usage permission information.

The permission bitmap is held in a memory of the application controller 708. The application controller 708 refers to a permission bitmap held in this memory and controls a usage range of a broadcast resource by a broadcast-excluding managed application.

The permission bitmap held in the memory is compared with a permission bitmap, which is stored in an external application control descriptor of a section AIT acquired by the information processing apparatus 700 after a broadcast-excluding managed application is activated. When there is a difference between those permission bitmaps, the permission bitmap in the memory is overwritten by the permission bitmap stored in the external application control descriptor of the section AIT. Hereinafter, the overwritten permission bitmap is referred to, and the usage range of the broadcast resource by the broadcast-excluding managed application is controlled by the application controller 708.

With this operation, the following system can be achieved: for example, the range of usage permission information, which is set for an XML-AIT created by a third party such as a provider of a broadcast-excluding managed application, can be dynamically changed by a broadcast station side using a section AIT.

In the service usage permission information, information on a behavior at the time of a permission error (Overlay_Permission_error_behaviour) is further described. The information on a behavior at the time of a permission error includes the following items, for example.

app_off: Hide display of an application.
video_off: Hide display of a video of a broadcast resource.
app_suspend: Hide display of an application and suspend the operation of the application.

In such a manner, when a permission error occurs, at least a video of the broadcast resource is set to a hidden state, and the use of the broadcast resource is substantially unavailable.

Next, the overlay area information (Overlay_area) will be described.

The overlay area information is information for defining an overlay area. The overlay area is an area on a display screen, in which a broadcast-excluding managed application is allowed to be displayed. In other words, the overlay area is an area that is set by being superimposed on an area where a broadcast video is mainly displayed.

The information for defining the overlay area includes an area ID (areaId), an ID of an element in an HTML application (elementId), an upper left horizontal coordinate of area (upper_left_horizontal), an upper left vertical coordinate of area (upper_left_vertical), a horizontal size of area (horizontal_size), a vertical size of area (vertical_size), and the like.

The area ID is an identifier for identifying an overlay area.

The ID of an element in an HTML application is an identifier that specifies an element in a broadcast-excluding managed application or a broadcast-excluding managed application associated with the overlay area.

The upper left horizontal coordinate of area and the upper left vertical coordinate of area are information for specifying coordinates at the upper left corner of the overlay area.

The vertical size of area and the horizontal size of area are information for specifying the vertical and horizontal sizes of the overlay area.

(Electronic Signature of XML-AIT)

An electronic signature for detecting a falsification is attached to the XML-AIT. As the electronic signature, for example, an XML signature is used. The form of the XML signature may be any of a detached signature that is independent from the XML-AIT, an enveloping signature having the form containing the XML-AIT, and an enveloped signature having the form contained in the XML-AIT. It should be noted that in order to suppress the influence on the format of the XML-AIT, it may be desirable to adopt the detached signature.

The application controller 708 of the information processing apparatus 700 validates the XML signature according to a procedure of a core validation including a reference validation and a signature validation.

The reference validation is a method of applying a normalization transformation process (Transform) and a digest calculation algorithm (DigestMethod) to a resource (XML-AIT) and thus validating a digest value (DigestValue) of a reference (Reference). When a result obtained by the reference validation and a registered digest value (DigestValue) are compared with each other and do not coincide with each other, the validation fails.

The signature validation is a method of serializing a signature information (SignatureInfo) element by a normalization method designated by an XML normalization algorithm (CanonicalizationMethod), acquiring key data by using key information (KeyInfo) and the like, and validating a signature by using a method designated by a signature algorithm (SignatureMethod).

(Structure of Section AIT)

FIG. 4 is a diagram showing the data structure of a section AIT.

The section AIT stores a table ID (table_id), a section syntax indicator (section_syntax_indicator), a section length (section_length), an application type (application_type), a version number (version_number), a current next indicator (current_next_indicator), a section number (section_number), a last section number (last_section_number), a common descriptor area 41 (descriptor), an application information loop length (application_loop_length), an application identifier (application_identifier), an application control code 42 (application_control_code), an application descriptor (application_descriptor), and the like.

The common descriptor area 41 stores an external application control descriptor (External_application_control_descriptor) for controlling the operation of a broadcast-excluding managed application.

(Syntax of External Application Control Descriptor)

FIG. 5 is a diagram showing the syntax of an external application control descriptor (External_application_control_descriptor).

In the external application control descriptor, a descriptor tag (descriptor_tag), a descriptor length (descriptor_length), a permission bitmap count (permission_bitmap_count), a permission bitmap 51 (permission_bitmap), and the like are described.

The permission bitmap 51 described in the section AIT is binary data indicating the range of usage permission of a broadcast resource by a broadcast-excluding managed application that is already activated in the information processing apparatus 700, that is, binary data of the service usage permission information. The permission bitmap is compared with a permission bitmap already held in the memory of the application controller 708 of the information processing apparatus 700.

It should be noted that the permission bitmap of the XML-AIT and the permission bitmap of the section AIT may contain binary data of information on a behavior at the time of a permission error. However, in this embodiment, only in the XML-AIT, the binary data of information on a behavior at the time of a permission error is contained in the permission bitmap.

In the external application control descriptor, an overlay admission polarity (overlay_admission_polarity) and an overlay controlled area count (overlay_controlled_area_count) are described as information on the overlay area.

The overlay admission polarity is information for specifying an overlay area defined by the section AIT to be an available area or an unavailable area.

The overlay controlled area count is information for specifying the number of overlay areas.

In the external application control descriptor, an overlay area tag (overlay_controlled_area_tag), an upper left horizontal coordinate of area (upper_left_horizontal), an upper left vertical coordinate of area (upper_left_vertical), a horizontal size of area (horizontal_size), a vertical size of area (vertical_size), and the like are further described as the information on the overlay area.

The overlay area tag is tag information for identifying the overlay area.

Information specified by each of the upper left horizontal coordinate of area, the upper left vertical coordinate of area, the horizontal size of area, and the vertical size of area is the same as information of a descriptor having the same name in the usage permission information descriptor of the XML-AIT.

In the external application control descriptor, a black/white application list count (bw_application_list_count), an application ID (application_identifier), a black/white polarity (black_white_polarity), and the like are further described.

The black/white application list count is information for specifying the number of applications to which the use of a broadcast resource is permitted or prohibited.

The application ID is an application ID of an application to which the use of a broadcast resource is permitted or prohibited.

The black/white polarity is information for specifying permission or prohibition of the use of a broadcast resource. For example, even in the case where the polarity in which the overlay area can be used is specified as an overlay admission polarity, when the black/white polarity specifies "prohibition" for a specific broadcast-excluding managed application, the use of the broadcast resource by the specific broadcast-excluding managed application is prohibited. Further, even in the case where the polarity in which the overlay area is unavailable is specified as an overlay admission polarity, when the black/white polarity specifies "permission" for a specific broadcast-excluding managed application, the use of the broadcast resource by the specific broadcast-excluding managed application is permitted.

(Definition of Application Control Code)

The life cycle of an application is dynamically controlled by the information processing apparatus 700 based on the application control codes 22 and 42 stored in the XML-AIT and the section AIT, respectively.

FIG. 6 is a diagram showing the definitions of the application control codes 22 and 42.

As shown in FIG. 6, as the application control codes 22 and 42, "AUTOSTART", "PRESENT", "DESTROY", "KILL", "PREFETCH", "REMOTE", "DISABLED", and "PLAYBACK_AUTOSTART" exist in the standard. The definitions of those application control codes are as follows.

The "AUTOSTART" is a code of an instruction to automatically activate an application along with the selection of a service. This is not applied to the case where the application is already in execution.

The "PRESENT" is a code of an instruction to make the application in an executable state while the service is being selected. However, a target application is not automatically activated along with the selection of a service and is activated when an activation instruction is received from the user.

The "DESTROY" is a code of an instruction to permit the termination of the application.

The "KILL" is a code of an instruction to force-quit the application.

The "PREFETCH" is a code of an instruction to cache the application.

The "REMOTE" is a code indicating an application that is not allowed to be acquired in the current transport stream. Such an application can be acquired from a different transport stream or a cache to be used.

The "DISABLED" is a code indicating the prohibition of the activation of the application.

The "PLAYBACK_AUTOSTART" is a code for activating an application along with the reproduction of broadcast content recorded in storage (recording apparatus).

(Configuration of Information Processing Apparatus 700)

Figure 7:
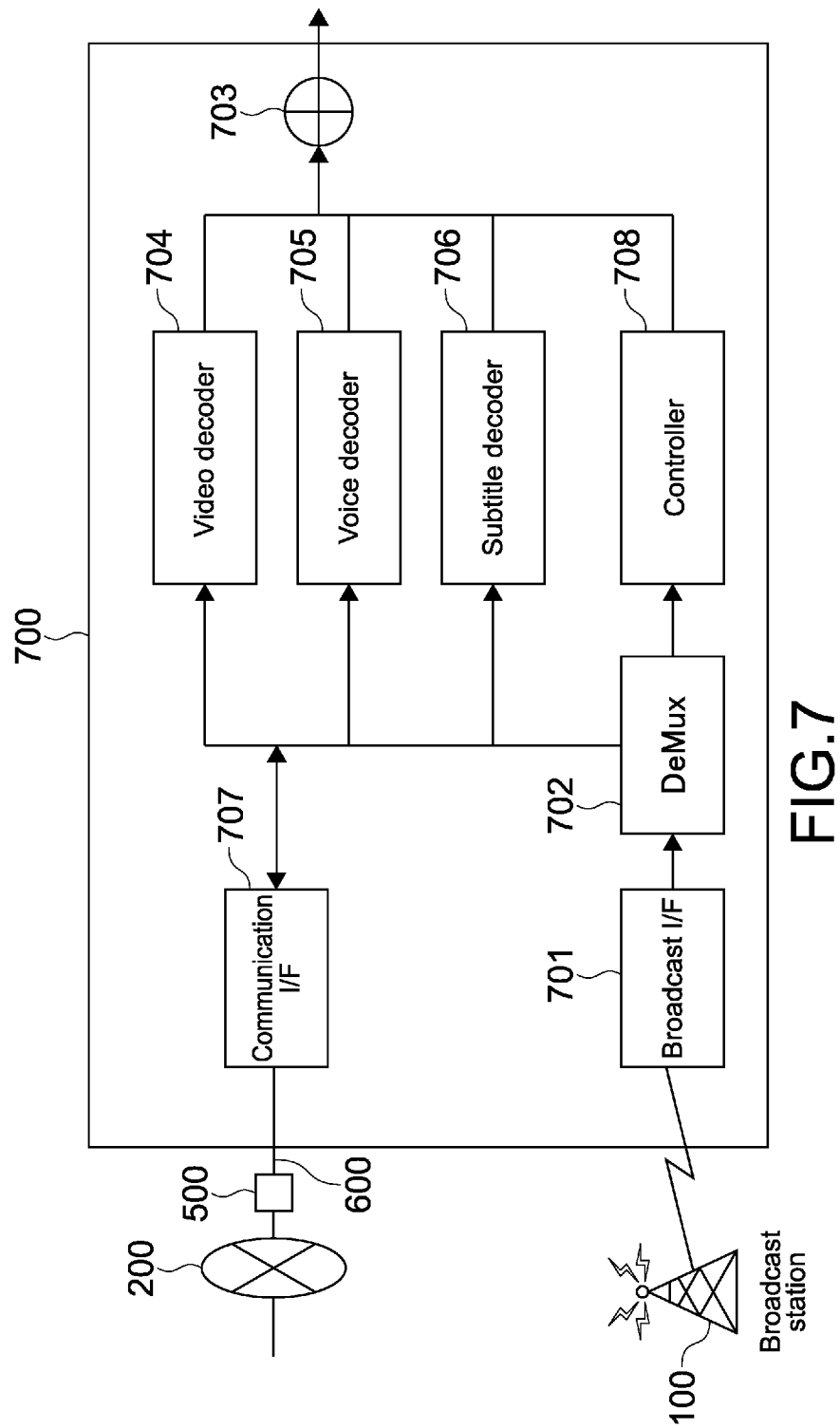
FIG. 7 is a block diagram showing the configuration of an information processing apparatus of this embodiment.

FIG. 7 is a block diagram showing the configuration of the information processing apparatus 700 of this embodiment.

The information processing apparatus 700 includes a broadcast interface 701, a demultiplexer 702, an output processing unit 703, a video decoder 704, a voice decoder 705, a subtitle decoder 706, a communication interface 707, and an application controller 708 (controller).

The broadcast interface 701 (broadcast receiving unit) includes an antenna and a tuner and receives a signal of digital broadcast whose channel is selected by the user using those antenna and tuner. The broadcast interface 701 outputs a transport stream to the demultiplexer 702. The transport stream is obtained by performing demodulation processing or the like on the received digital broadcast signal.

The demultiplexer 702 separates a stream packet of broadcast content, a packet of an application, and a packet of an AIT section from the transport stream. The demultiplexer 702 separates a video ES (Elementary Stream), a voice ES, and a subtitle ES from the stream packet of the broadcast content. The demultiplexer 702 distributes the video ES to the video decoder 704, the voice ES to the voice decoder 705, the subtitle ES to the subtitle decoder 706, and the packet of the application and the packet of PSI/SI (Program Specific Information/Service Information) including the AIT section to the application controller 708.

The video decoder 704 decodes the video ES to generate a video signal and outputs the generated video signal to the output processing unit 703. The voice decoder 705 decodes the voice ES to generate a voice signal and outputs the generated voice signal to the output processing unit 703.

The subtitle decoder 706 decodes the subtitle ES to generate a subtitle signal and outputs the generated subtitle signal to the output processing unit 703.

The broadcast interface 701, the demultiplexer 702, the output processing unit 703, the video decoder 704, the voice decoder 705, and the subtitle decoder 706 correspond to a broadcast content processing unit that performs processing of receiving and presenting the broadcast content.

The communication interface 707 is an interface for communicating with an external device via the second network 600 such as a LAN. The communication interface 707 may perform wireless or wired communication.

The application controller 708 (controller) is a controller that performs processing on the control of an application.

The output processing unit 703 combines the video signal from the video decoder 704, the voice signal from the voice decoder 705, the subtitle signal from the subtitle decoder 706, and the video signal, the voice signal, and the like from the application controller 708 with one another and outputs the resultant signal to a recording apparatus (not shown), and a display unit and a speaker unit (not shown), which are connected to the information processing apparatus 700.

A part or the whole of the configuration including at least the application controller 708 of the information processing apparatus 700 described above can be provided by a computer including a CPU and a memory and a program causing the computer to function as the application controller 708 or the like.

(Operation of Information Processing System 10)

Next, the operation of the information processing system 10 of this embodiment will be described.

(1. Control of Usage Permission Range of Broadcast Resource (Part 1))

FIG. 8 is a sequence diagram showing the flow of interaction among the broadcast station 100 (broadcast apparatus), the application server 300, the XML-AIT server 400, and the information processing apparatus 700. FIG. 9 is a flowchart showing a processing procedure by the application controller 708 of the information processing apparatus 700.

The information processing apparatus 700 displays an application launcher selected by a user using a remote controller or the like (Step S101). The application launcher is achieved by, for example, a so-called resident application, which is implemented in the information processing apparatus 700, HTML5 (Hyper Text Markup Language 5) presented by an HTML browser, BML (Broadcast Markup Language), and the like. In the application launcher, the menu of selectable broadcast-excluding managed applications is displayed.

The user can select a broadcast-excluding managed application desired to be used by using a remote controller, for example. In the menu of the broadcast-excluding managed applications displayed in the application launcher, a script for causing the information processing apparatus 700 to acquire an XML-AIT for a broadcast-excluding managed application, and the like are incorporated.

When an optional broadcast-excluding managed application is selected by an operation of the user using the remote controller on the menu of the broadcast-excluding managed applications displayed in the application launcher (Step S102), the application controller 708 acquires an XML-AIT for that optional broadcast-excluding managed application from the XML-AIT server 400 by executing a script corresponding to that broadcast-excluding managed application (Step S103).

The application controller 708 of the information processing apparatus 700 acquires a broadcast-excluding managed application from the application server 300 based on location information of the application described in the acquired XML-AIT (Step S104).

The application controller 708 activates the acquired broadcast-excluding managed application according to the application control code "AUTOSTART" described in the XML-AIT (Step S105).

After activation of the broadcast-excluding managed application, the application controller 708 monitors an access request to a broadcast resource from the broadcast-excluding managed application (Step S106). Upon detection of an access request to a broadcast resource from the broadcast-excluding managed application (Y of Step S107), the application controller 708 checks whether a broadcast station public key certificate corresponding to that broadcast resource is stored in the memory of the information processing apparatus 700 (Step S107).

In the case where a broadcast station public key certificate is not stored in the memory of the information processing apparatus 700, the application controller 708 of the information processing apparatus 700 waits until a target broadcast station public key certificate is transmitted by data carousel. Upon reception of a target broadcast station public key certificate, the application controller 708 stores the broadcast station public key certificate in the memory (Step S108).

The application controller 708 verifies an electronic signature attached to the broadcast-excluding managed application being executed, by using the broadcast station public key certificate stored in the memory (Step S110). In the case where the verification of the electronic signature fails (N of Step S111), the application controller 708 regards that the broadcast-excluding managed application is not authenticated by a broadcast station and makes a setting to prohibit access to all broadcast resources of that broadcast station (Step S112). In the state where the access to a broadcast resource is prohibited, the access to a broadcast resource is not allowed even when the broadcast-excluding managed application is activated.

In the case where the verification of the electronic signature succeeds (Y of Step S111), the application controller 708 determines availability of access to a broadcast resource for which an access request is made by the broadcast-excluding managed application, based on the service usage permission information in the usage permission information descriptor 21 described in the XML-AIT (Step S113).

It should be noted that the service usage permission information in the usage permission information descriptor 21 described in the XML-AIT is held as a permission bitmap (binary data) in the memory of the application controller 708. The application controller 708 refers to this permission bitmap and determines availability of access to a broadcast resource for which an access request is made by the broadcast-excluding managed application.

Here, for example, the case where the permission specifying unit in the service usage permission information is "service" is assumed. In this case, information for specifying a channel is specified by the network ID, the transport stream ID, and the service ID based on the service usage permission information in the usage permission information descriptor 21. In this case, that channel is assumed as a "channel x". In this example, when a channel for which an access request is made by the broadcast-excluding managed application is a "channel x", the application controller 708 accepts the access request to permit access to the "channel x".

If an access request is made for a different channel by the broadcast-excluding managed application, the application controller 708 determines the occurrence of a permission error. In this case, the application controller 708 controls the operation of the broadcast-excluding managed application according to information on a behavior at the time of a permission error, the information being stored in the service usage permission information of the usage permission information descriptor 21.

In such a manner, in the case where the verification of the electronic signature succeeds, the application controller 708 controls the broadcast-excluding managed application to access a broadcast resource in the range permitted based on the service usage permission information of the XML-AIT (Step S114).

Meanwhile, the broadcast station 100 periodically transmits a section AIT for controlling the operation of the broadcast-excluding managed application that is being executed in the information processing apparatus 700. The transmission period of the section AIT is set to about 100 ms, for example. The generation of the section AIT is managed by a version number. The application controller 708 holds the version number of the section AIT acquired last and receives a section AIT having a version number that is different from the held version number (Step S115).

The application controller 708 checks whether an external application control descriptor is added to the received section AIT or not (Step S116). In the case where an external application control descriptor is not added (N of Step S116), the control of usage permission of the broadcast resource based on the usage permission information descriptor 21 stored in the XML-AIT (the permission bitmap held in the memory) is continued.

In the case where an external application control descriptor is added to the acquired section AIT (Y of Step S116), the application controller 708 compares the permission bitmap of that external application control descriptor with the permission bitmap held in the memory (Step S117). When there is a difference between those permission bitmaps (Y of Step S117), the application controller 708 updates the permission bitmap of the memory by the permission bitmap of the external application control descriptor (Step S118). With this operation, the usage permission range of the broadcast resource, which is intended by the broadcast station side, is set in the information processing apparatus 700.

It should be noted that when there is no difference between the permission bitmap of the external application control descriptor and the permission bitmap held in the memory (N of Step S117), the permission bitmap held in the memory is left without change, and the control of usage permission of the broadcast resource based on the permission bitmap is continued.

Subsequently, for example, when an instruction to terminate the application or transfer to another application occurs by an operation by a user using a remote controller (YES of Step S120), the application controller 708 of the information processing apparatus 700 terminates the broadcast-excluding managed application (Step S122).

Further, in the case where an application control code other than "AUTOSTART", "DESTROY", and "KILL" is described in the section AIT acquired during execution of the broadcast-excluding managed application, the application controller 708 of the information processing apparatus 700 performs processing of transferring the state of the broadcast-excluding managed application according to that application control code and other processing (Step S121), and subsequently waits for the next section AIT.

Subsequently, the same processing is performed on a received section AIT.

Afterward, also in the case where the switching of programs (program A to program B) in the same channel (channel x) occurs, the same processing is repeated for a section AIT acquired after the switching to the program B.

Further, also in the case where the switching of channels occurs, the same processing is repeated for a section AIT acquired after the switching to the channel.

(2. Control of Usage Permission Range of Broadcast Resource (Part 2))

When a broadcast-excluding managed application is being executed, for example, an operation of switching a broadcast channel by a manual operation by a user or the like (direct channel selection operation) is performed in some cases.

Figure 10:
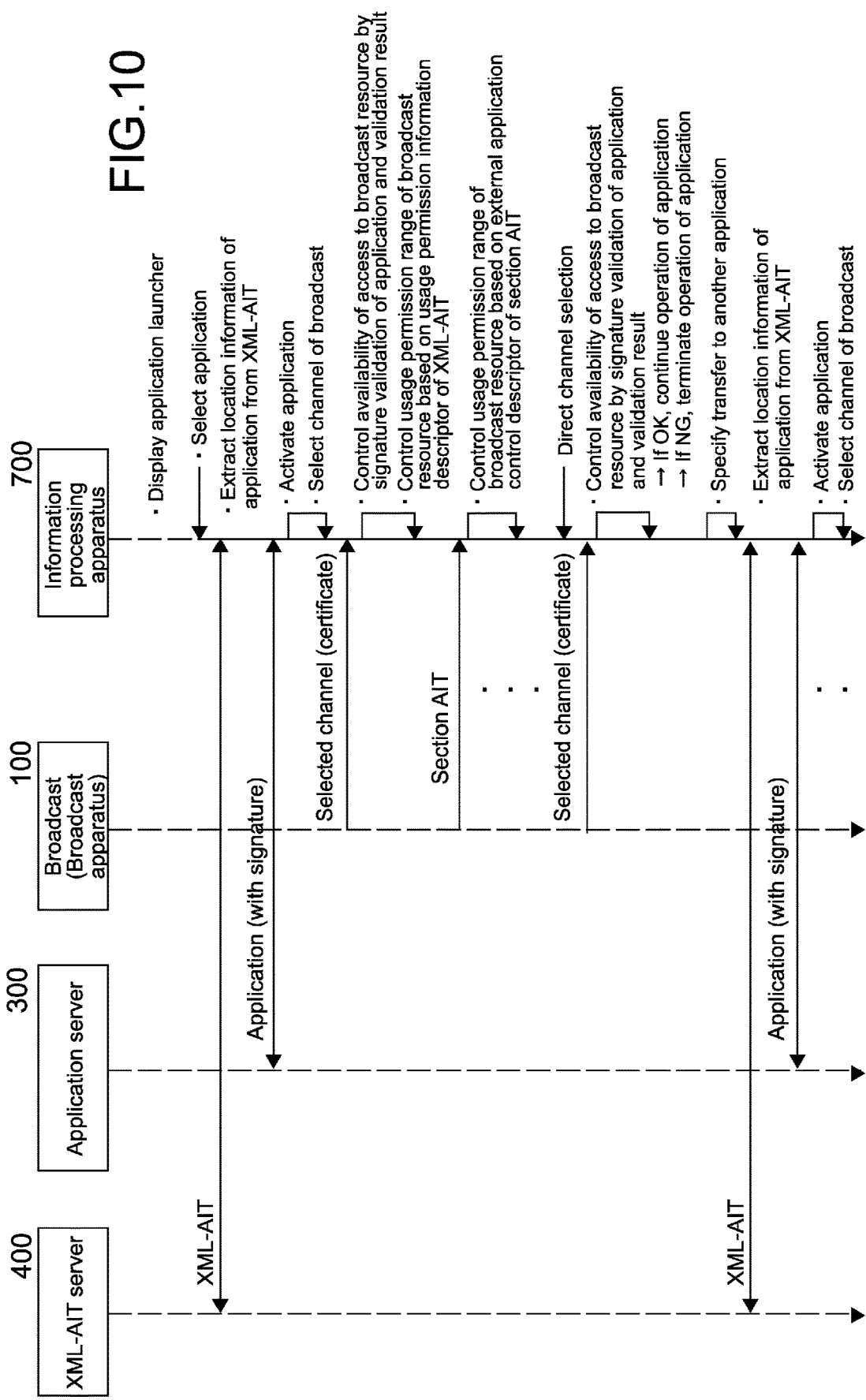
FIG. 10 is a sequence diagram showing the flow of interaction among the broadcast station, the application server, the XML-AIT server, and the information processing apparatus in the case where a direct channel selection operation is performed during execution of a broadcast-excluding managed application.
Figure 11:
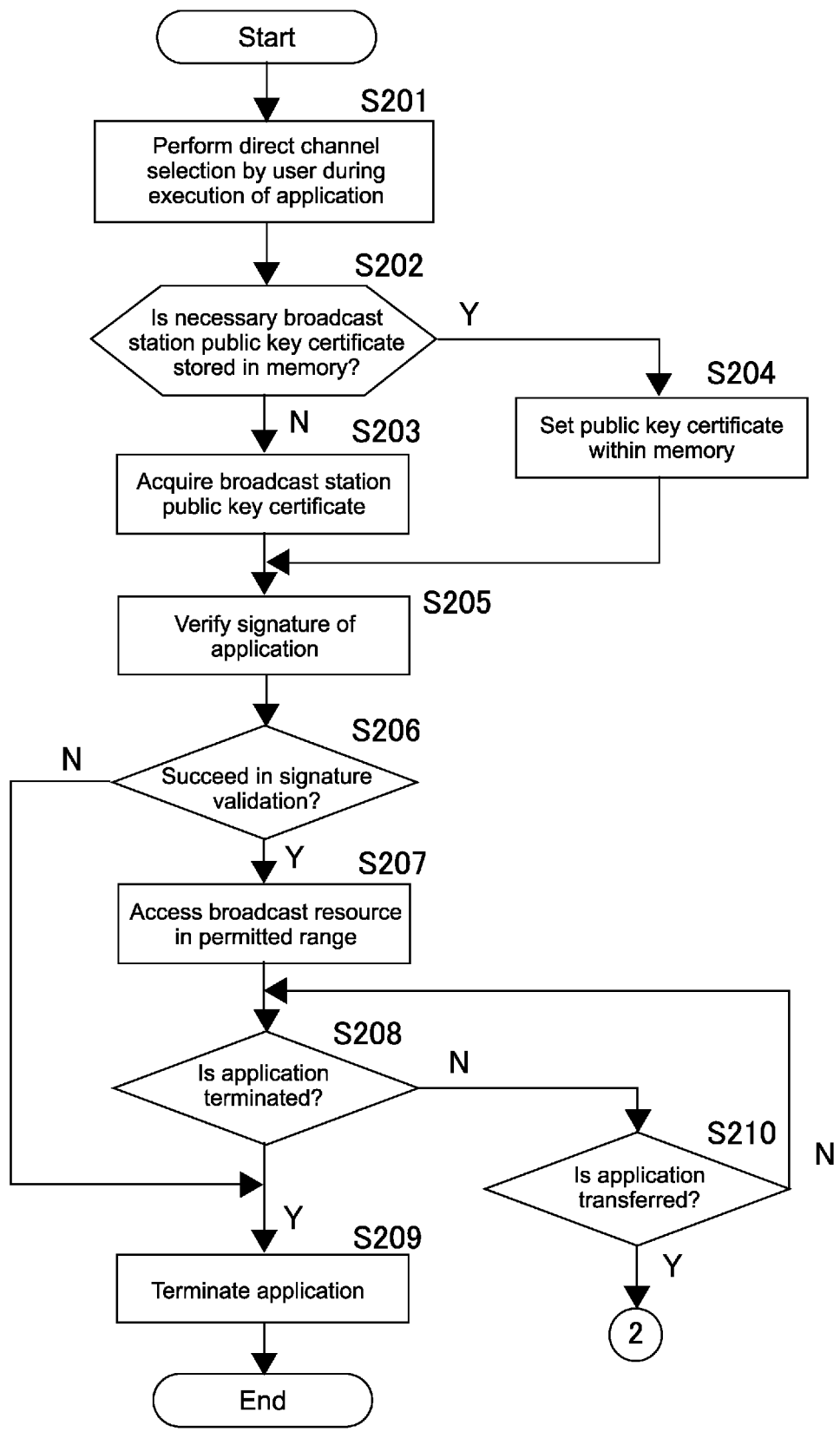
FIG. 11 is a flowchart showing the flow of control of the application controller in the case where the direct channel selection operation is performed during execution of the broadcast-excluding managed application.

FIG. 10 is a sequence diagram showing the flow of interaction among the broadcast station 100 (broadcast transmitting apparatus), the application server 300, the XML-AIT server 400, and the information processing apparatus 700 in the case where a direct channel selection operation is performed during execution of a broadcast-excluding managed application. FIG. 11 is a flowchart showing the flow of control of the application controller 708 in the case where a direct channel selection operation is performed during execution of a broadcast-excluding managed application.

When a direct channel selection operation is performed during execution of a broadcast-excluding managed application (Step S201), the application controller 708 of the information processing apparatus 700 checks whether a broadcast station public key certificate corresponding to a broadcast channel directly selected is stored in the memory of the information processing apparatus 700 or not (Step S202).

In the case where a broadcast station public key certificate is not stored in the memory of the information processing apparatus 700, the application controller 708 of the information processing apparatus 700 waits until a target broadcast station public key certificate is transmitted by data carousel of the switched broadcast channel or the like. Upon reception of a target broadcast station public key certificate transmitted by data carousel or the like, the application controller 708 of the information processing apparatus 700 stores the target broadcast station public key certificate in the memory (Step S203).

It should be noted that the example in which the broadcast station public key certificate is transmitted by data carousel is described here, but a public key certificate may be acquired through communication, such as a case where a public key certificate is acquired from a previously specified server.

The application controller 708 verifies an electronic signature attached to the broadcast-excluding managed application being executed, by using the broadcast station public key certificate stored in the memory (Step S205). In the case where the verification of the electronic signature fails (N of Step S206), the application controller 708 terminates that broadcast-excluding managed application (Step S209).

In the case where the verification of the electronic signature succeeds (Y of Step S206), the application controller 708 continues the operation of the broadcast-excluding managed application and controls the broadcast-excluding managed application to access a broadcast resource in the range permitted based on the permission bitmap (Step S207).

The subsequent operations are the same as Step S120 and subsequent steps of FIG. 9.

Further, as shown in FIG. 11, during operation of the broadcast-excluding managed application, for example, an instruction to transfer to a different broadcast-excluding managed application is generated in some cases by execution of a script incorporated in the broadcast-excluding managed application, a manual operation of the user, or the like. In this case, the application controller 708 performs control as in the case where the user selects the broadcast-excluding managed application from the application launcher described above.

(3. Control of Overlay Area)

As already described above, in the XML-AIT and the section AIT, overlay area information (Overlay_area) for defining an area on a display screen D to be an overlay area can be described. In the area on the display screen D, a broadcast-excluding managed application can be displayed.

Figure 12:
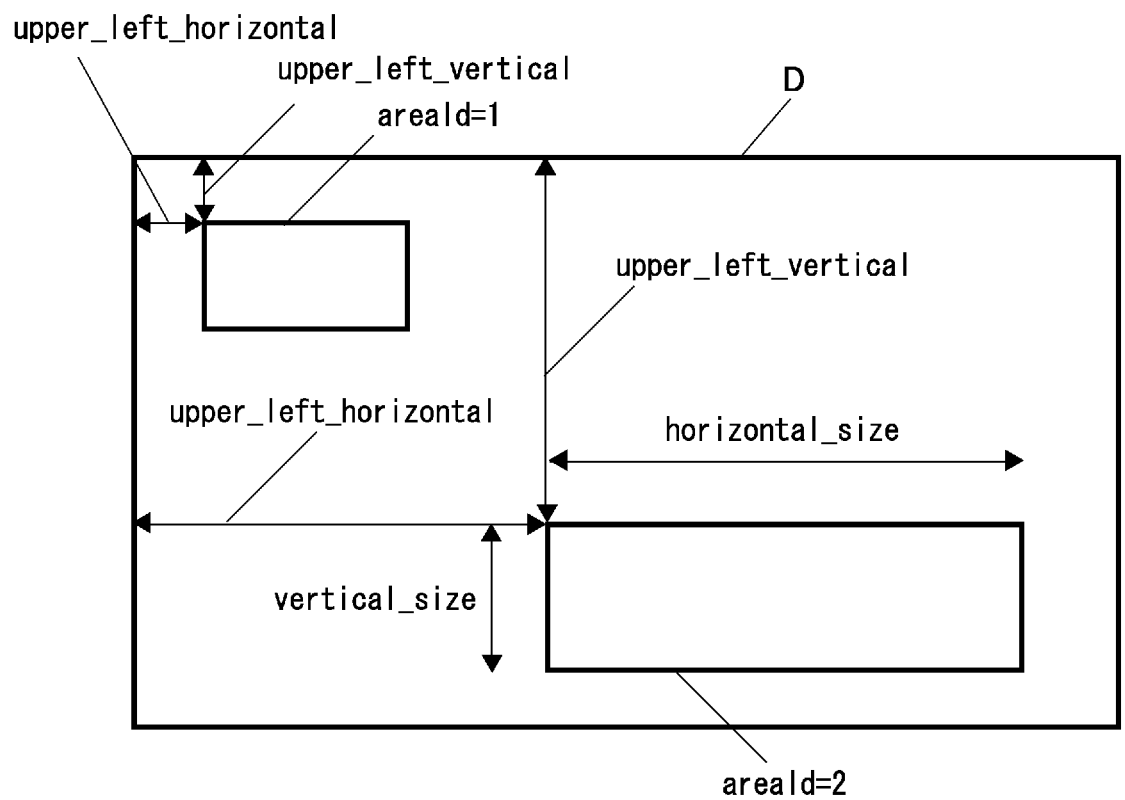
FIG. 12 is a diagram showing a setting example of an overlay area based on overlay area information in the usage permission information descriptor of the XML-AIT.

FIG. 12 is a diagram showing a setting example of an overlay area based on overlay area information in the usage permission information descriptor 21 of the XML-AIT.

In the setting example, there are two overlay areas, areaId=1 and areaId=2. For each of the overlay areas, an area in the display screen D is defined by an upper left horizontal coordinate of area (upper_left_horizontal), an upper left vertical coordinate of area (upper_left_vertical), a horizontal size of area (horizontal_size), and a vertical size of area (vertical_size).

The application controller 708 creates each of the overlay areas based on the overlay area information (Overlay_area) in the usage permission information descriptor 21 of the XML-AIT.

The application controller 708 can create overlay areas anew based on information on an overlay area, the information being included in the external application control descriptor (External_application_control_descriptor) of the common descriptor area 41 (descriptor) of a section AIT acquired after the broadcast-excluding managed application is activated. Specifically, the update to an overlay area intended by the broadcast station 100 can be performed.

FIG. 13 is a diagram showing a first update example of an overlay area.

In this example, an overlay area 1 is created based on overlay area information (Overlay_area) in the usage permission information descriptor 21 of an XML-AIT. Further, in the overlay area 1, a display area 2 for a broadcast-excluding managed application is assumed to be provided.

For example, after the switching of channels, the application controller 708 creates a new overlay area 3, instead of the existing overlay area 1, based on information on an overlay area included in the external application control descriptor of the received section AIT.

In the case where a change from the overlay area 1 to the overlay area 3 occurs, the application controller 708 performs control to move the display area 2 of the broadcast-excluding managed application to the overlay area 3 newly created, according to a program incorporated in the application controller 708.

It should be noted that the position of the display area 2 of the broadcast-excluding managed application is controlled by the application controller 708. For example, the position of the display area 2 of the broadcast-excluding managed application is controlled such that the display area 2 of the broadcast-excluding managed application is disposed at a predetermined position. In the case where the display areas 2 of a plurality of broadcast-excluding managed applications are simultaneously displayed, each other's positions are exclusively controlled by the application controller 708.

FIG. 14 is a diagram showing a second update example of an overlay area.

In this example, in the case where a change from the existing overlay area 1 to the overlay area 3 occurs based on information on an overlay area included in the external application control descriptor of a section AIT, the application controller 708 performs the following control according to a program previously incorporated in the application controller 708.

First, the application controller 708 reduces the size of a broadcast video display portion 4 from a state where the entire area of the display screen D is used as the broadcast video display portion 4, for example, and a free space thus obtained is set as an application display portion 5. The application controller 708 performs control such that a display area 2 of the broadcast-excluding managed application is displayed in the application display portion 5, irrespective of the information on the overlay area of the external application control descriptor.

With this operation, the overlap of the broadcast-excluding managed application with the video of the broadcast video display portion 4 can be avoided.

FIG. 15 is a diagram showing a third update example of an overlay area.

This example assumes a case where an overlay area 1 using the entire area of the display screen D is set based on the overlay area information of an XML-AIT. A display area 2 of the broadcast-excluding managed application is assigned to the entire overlay area 1, and a broadcast video display portion 4 is set in a part of the display area 2.

The application controller 708 creates a new overlay area 3, instead of the existing overlay area 1, based on information on an overlay area included in the external application control descriptor of a section AIT received after channel switching, for example.

At that time, the application controller 708 sets a broadcast video display portion 4 in the entire area of the display screen D according to a program incorporated in the application controller 708 and hides the display area 2 of the broadcast-excluding managed application. With this operation, the video of the broadcast video display portion 4 can be avoided to be partially hidden by the broadcast-excluding managed application. Further, in the third update example, in the case where a subelement constituting the broadcast-excluding managed application (specified by elementId) is specified to a position of the overlay area 3, the subelement may be displayed.

(4. Generation and Validation of Electronic Signature)

Next, the generation and validation of an electronic signature will be described.

Figure 16:
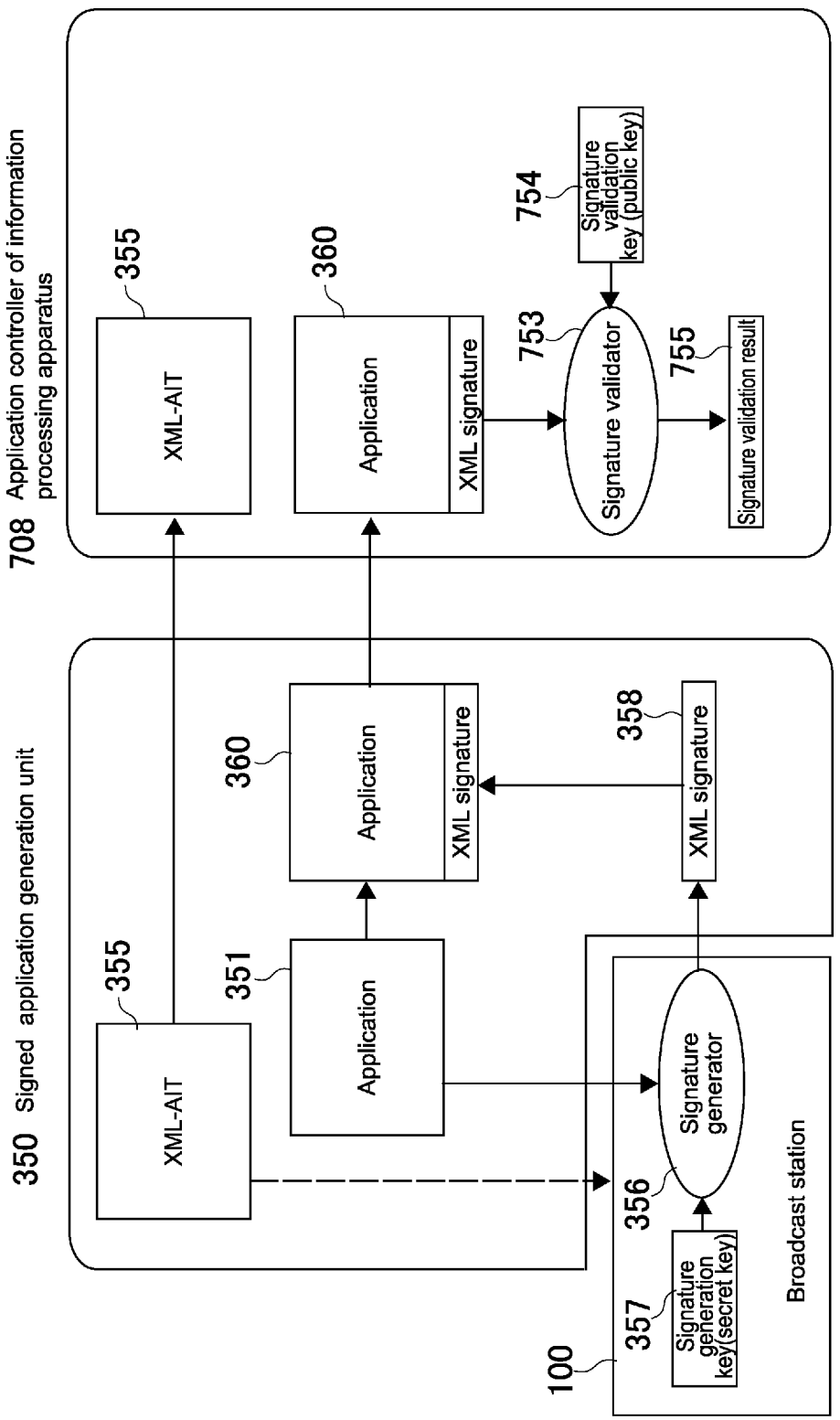
FIG. 16 is a block diagram for describing a system of the generation and validation of an electronic signature.

FIG. 16 is a block diagram for describing a system of the generation and validation of an electronic signature.

The XML-AIT server 400 and the application server 300 may be one server that an application creator owns or may be separate servers. Here, the XML-AIT server 400 and the application server 300 are collectively referred to as "server". The server is a device having a configuration of a typical computer. So, the server is constituted of a CPU, a main memory, a storage device such as an HDD (hard disk drive), input devices such as a mouse and a keyboard, a display unit such as a liquid crystal display, and the like. The main memory and the storage device store an OS (Operating System), software such as an application program for the server, a broadcast-excluding managed application provided to the information processing apparatus 700, an XML-AIT file for each application, a signature generation key, and the like.

The server includes a signed application generation unit 350. Specifically, the signed application generation unit 350 is achieved by a program loaded to the main memory and a CPU that executes the program.

The application creator requests the broadcast station 100 to authenticate a broadcast-excluding managed application 351 and an XML-AIT 355.

The broadcast station 100 reviews the content of the broadcast-excluding managed application 351 and the XML-AIT 355, which are authentication targets requested by the application creator. If there are no problems, the broadcast station 100 sets, of a pair of a secret key issued by a route CA 800 (FIG. 1) and a broadcast station public key certificate, the secret key to be a signature generation key 357 in a signature generator 356. The signature generator 356 uses a hash function for a signature for the broadcast-excluding managed application 351 to generate a digest, encrypts the digest with the signature generation key (secret key) 357, and generates an XML signature 358. The broadcast station 100 responds to the server by providing the generated XML signature 358. The signed application generation unit 350 adds the XML signature 358, which is provided as a response by the broadcast station 100, to the broadcast-excluding managed application 351, generates an application 360 with an electronic signature, and delivers the application 360 to the information processing apparatus 700.

The application controller 708 of the information processing apparatus 700 extracts the XML signature from the application 360 with an electronic signature, which is acquired from the server, in a signature generator 753. The application controller 708 uses a public key 754, which is a signature validation key extracted from the broadcast station public key certificate, to verify the XML signature and obtains a signature validation result 755.

Next, a method of transmitting the broadcast station public key certificate from the broadcast station 100 to the information processing apparatus 700 will be described. The method of transmitting the broadcast station public key certificate from the broadcast station 100 to the information processing apparatus 700 includes a dedicated module system, a data broadcast extending system (Part 1), a data broadcast extending system (Part 2), and the like.

(Dedicated Module System)

Figures 17, 18:
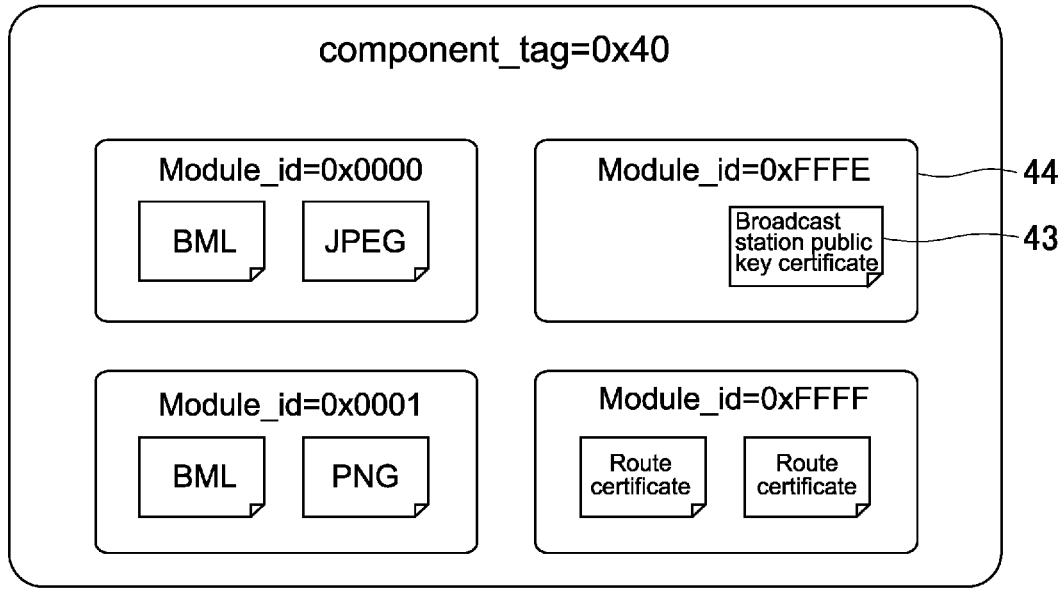
FIG. 17 is a conceptual diagram of a dedicated module system.
FIG. 18 is a diagram showing the configuration of a broadcast station public key certificate descriptor.

FIG. 17 is a conceptual diagram of a dedicated module system.

In the dedicated module system, a dedicated module (for example, module_id=0xFFFE etc.) 44 for transmitting the broadcast station public key certificate 43 is newly disposed in a module, component_tag=0x40, including a start document to be activated first when a user selects a data broadcast program.

Further, in order to inform the information processing apparatus 700 of an update of the broadcast station public key certificate distributed by the dedicated module described above, a DII (Download Info Indication) of a broadcast station public key certificate descriptor is disposed.

FIG. 18 is a diagram showing the configuration of the broadcast station public key certificate descriptor.

The broadcast station public key certificate descriptor (broadcast_certificate_descriptor) includes an ID for identifying a broadcast station public key certificate (broadcaster_certificate_id) and a version of the broadcast station public key certificate (broadcaster_certificate_version).

Figure 19:
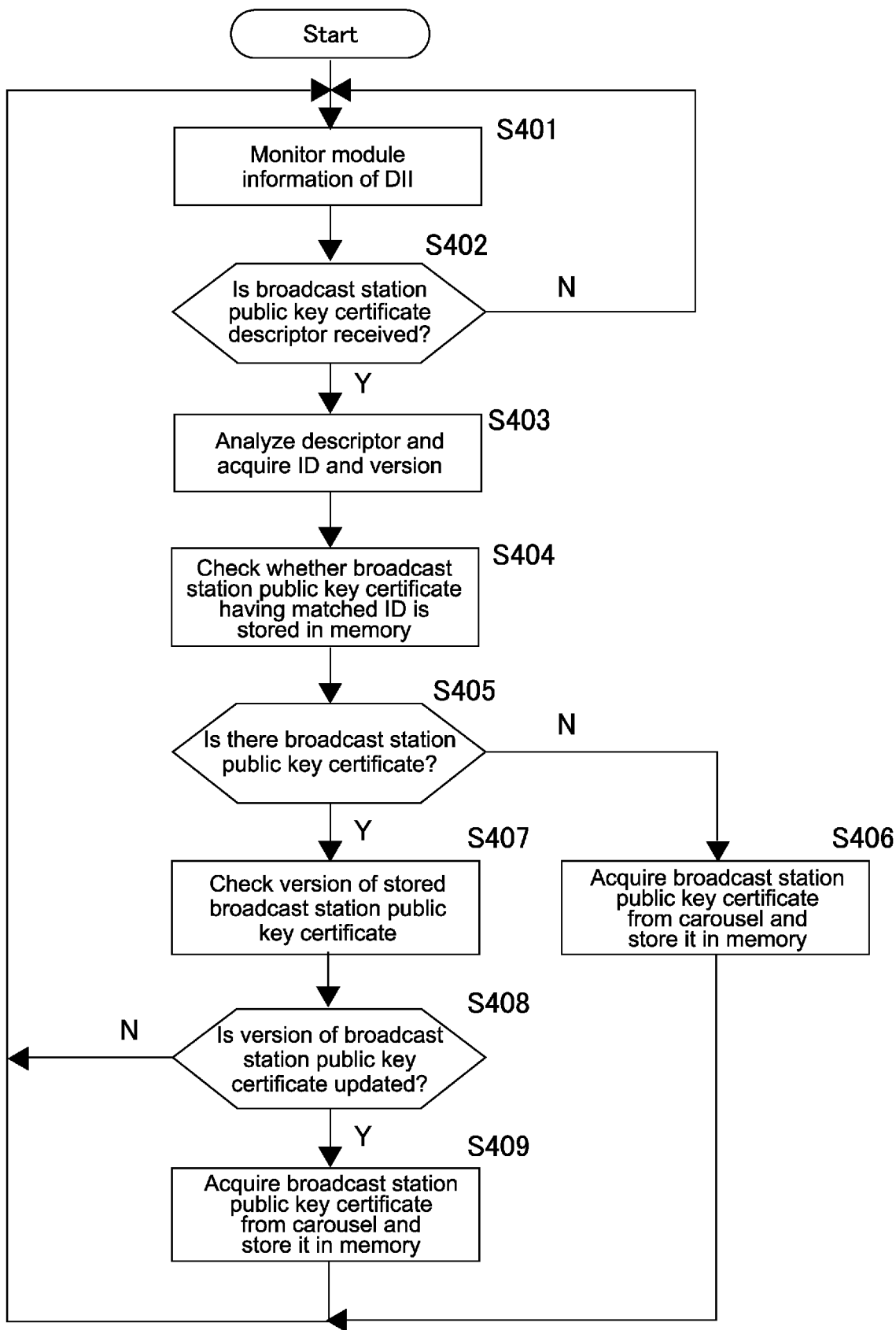
FIG. 19 is a flowchart on the acquisition and update of a broadcast station public key certificate by the dedicated module system.

FIG. 19 is a flowchart on the acquisition and update of the broadcast station public key certificate by the dedicated module system.

First, the application controller 708 of the information processing apparatus 700 monitors module information of a DII transmitted by data carousel (Step S401). Upon detection that the broadcast station public key certificate descriptor is included in the module information of the DII (Y of Step S402), the application controller 708 of the information processing apparatus 700 analyzes the broadcast station public key certificate descriptor and extracts an ID and a version from the broadcast station public key certificate descriptor (Step S403).

The application controller 708 compares the ID of the broadcast station public key certificate already stored in the memory with the ID acquired now and checks whether the broadcast station public key certificate having the matched ID is stored in the memory or not (Step S404). In the case where an appropriate broadcast station public key certificate is not stored (N of Step S405), the application controller 708 acquires a broadcast station public key certificate transmitted by data carousel and stores the broadcast station public key certificate in the memory (Step S406). Subsequently, the application controller 708 returns to a state of monitoring the module information of the DII.

In the case where an appropriate broadcast station public key certificate is stored (Y of Step S405), the application controller 708 checks the version of the broadcast station public key certificate stored in the memory (Step S407). The application controller 708 compares the checked version of the broadcast station public key certificate with the version of the broadcast station public key certificate, which is acquired now, and determines whether the version upgrade of the broadcast station public key certificate occurs or not (Step S408).

When it is determined that the version upgrade of the broadcast station public key certificate does not occur (N of Step S408), the application controller 708 returns to the state of monitoring the module information of the DII.

When it is determined that the version upgrade of the broadcast station public key certificate occurs (Y of Step S408), the application controller 708 acquires a broadcast station public key certificate transmitted by data carousel and stores the broadcast station public key certificate in the memory (Step S409). Subsequently, the application controller 708 returns to the state of monitoring the module information of the DII.

In such a manner, the information processing apparatus 700 can acquire one or more types of the latest versions of broadcast station public key certificates with different IDs and store those broadcast station public key certificates in the memory.

(Data Broadcast Extending System (Part 1))

FIG. 20 is a diagram showing the configuration of a route certificate descriptor by a data broadcast extending system (Part 1).

The data broadcast extending system (Part 1) performs extension for transmitting a public key certificate of a new service on "root_certificate_type" of a route certificate descriptor and describes an ID for identifying the broadcast station public key certificate (broadcaster_certificate_id) and a version of the broadcast station public key certificate (broadcaster_certificate_version) in "root_certificate_type".

Figure 21:
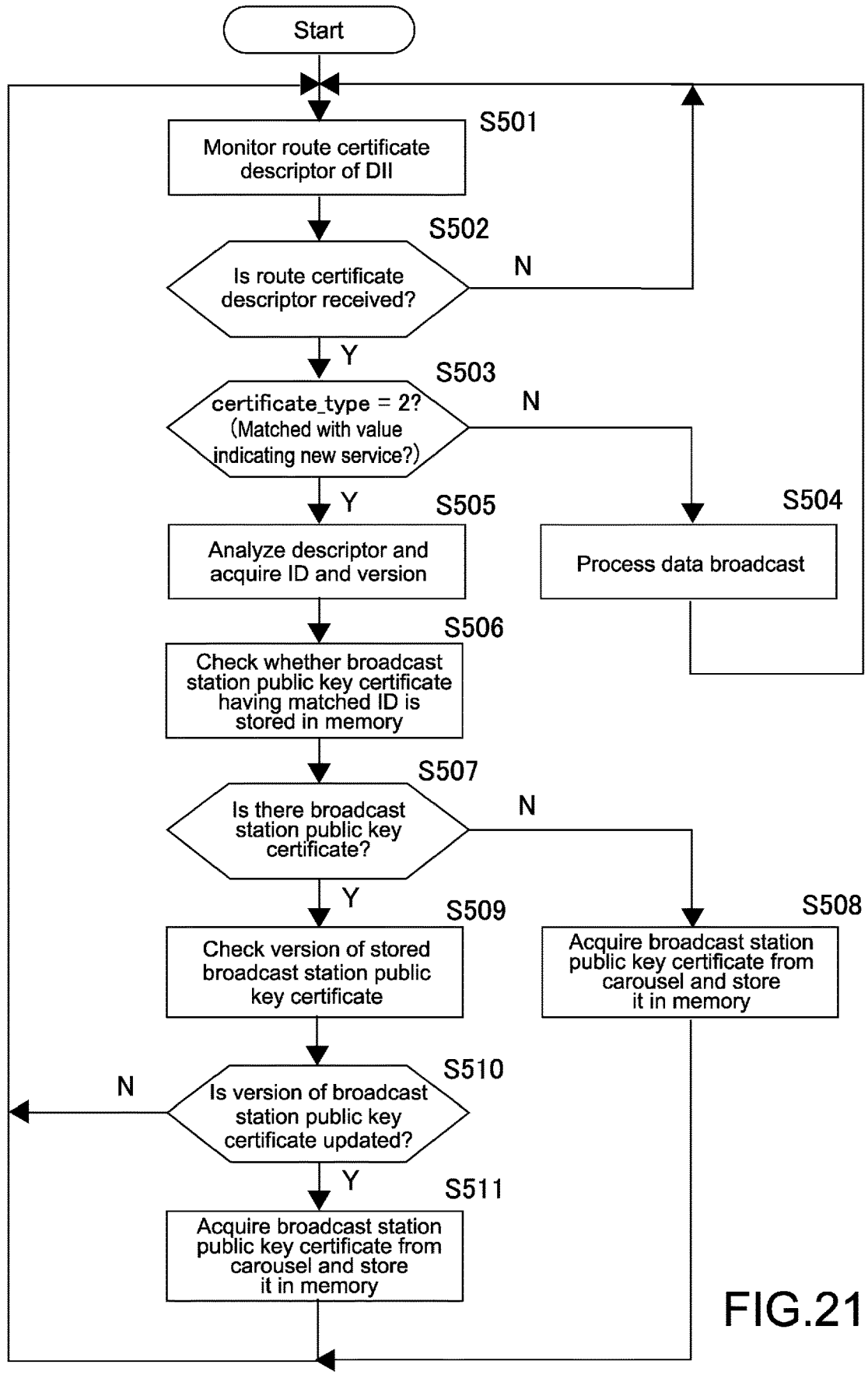
FIG. 21 is a flowchart on the acquisition and update of the broadcast station public key certificate by the data broadcast extending system (Part 1).

FIG. 21 is a flowchart on the acquisition and update of the broadcast station public key certificate by the data broadcast extending system (Part 1).

First, the application controller 708 of the information processing apparatus 700 monitors a route certificate descriptor of a DII transmitted by data carousel (Step S501). Upon detection of the route certificate descriptor of the DII (Y of Step S502), the application controller 708 of the information processing apparatus 700 analyzes the route certificate descriptor and determines whether a value indicating a new service (root_certificate_type=2) is described in the route certificate descriptor (Step S503). When the value indicating a new service (root_certificate_type=2) is not described, the application controller 708 processes data broadcast (Step S504), and subsequently returns to a state of monitoring the route certificate descriptor of the DII.

When the value indicating a new service (root_certificate_type=2) is described in the route certificate descriptor, the application controller 708 extracts an ID and a version of a broadcast station public key certificate from the route certificate descriptor (Step S505). The subsequent operations from Step S506 to Step S511 are the same as those of Step S404 to Step S409 in the dedicated module system, and thus description thereof will be omitted.

The application controller 708 compares the ID of the broadcast station public key certificate already stored in the memory with the ID acquired now and checks whether the broadcast station public key certificate having the matched ID is stored in the memory or not (Step S506). In the case where an appropriate broadcast station public key certificate is not stored (N of Step S507), the application controller 708 acquires a broadcast station public key certificate transmitted by data carousel and stores the broadcast station public key certificate in the memory (Step S508). Subsequently, the application controller 708 returns to the state of monitoring the route certificate descriptor of the DII.

In the case where an appropriate broadcast station public key certificate is stored (Y of Step S507), the application controller 708 checks the version of the broadcast station public key certificate stored in the memory (Step S509). The application controller 708 compares the checked version of the broadcast station public key certificate with the version of the broadcast station public key certificate, which is acquired now, and determines whether the version upgrade of the broadcast station public key certificate occurs or not (Step S510).

When it is determined that the version upgrade of the broadcast station public key certificate does not occur (N of Step S510), the application controller 708 returns to the state of monitoring the route certificate descriptor of the DII.

When it is determined that the version upgrade of the broadcast station public key certificate occurs (Y of Step S510), the application controller 708 acquires a broadcast station public key certificate transmitted by data carousel and stores the broadcast station public key certificate in the memory (Step S511). Subsequently, the application controller 708 returns to the state of monitoring the route certificate descriptor of the DII.

In such a manner, the information processing apparatus 700 can acquire one or more types of the latest versions of broadcast station public key certificates with different IDs and store those broadcast station public key certificates in the memory.

(Data Broadcast Extending System (Part 2))

In a data broadcast extending system (Part 2), among storage areas capable of transmitting a public key certificate directed to data broadcast in the route certificate descriptor, one fixed storage area is assigned for a new service, and an ID for identifying the broadcast station public key certificate (broadcaster_certificate_id) and a version of the broadcast station public key certificate (broadcaster_certificate_version) are described in the fixed storage. Further, for example, as shown in FIG. 22, a new flag (broadcaster_certificate_flag) is disposed in the route certificate descriptor. For example, when the value of the flag is "1", this indicates that the broadcast station public key certificate is transmitted, and when the value of the flag is "0", this indicates that the broadcast station public key certificate is not transmitted.

Figure 23:
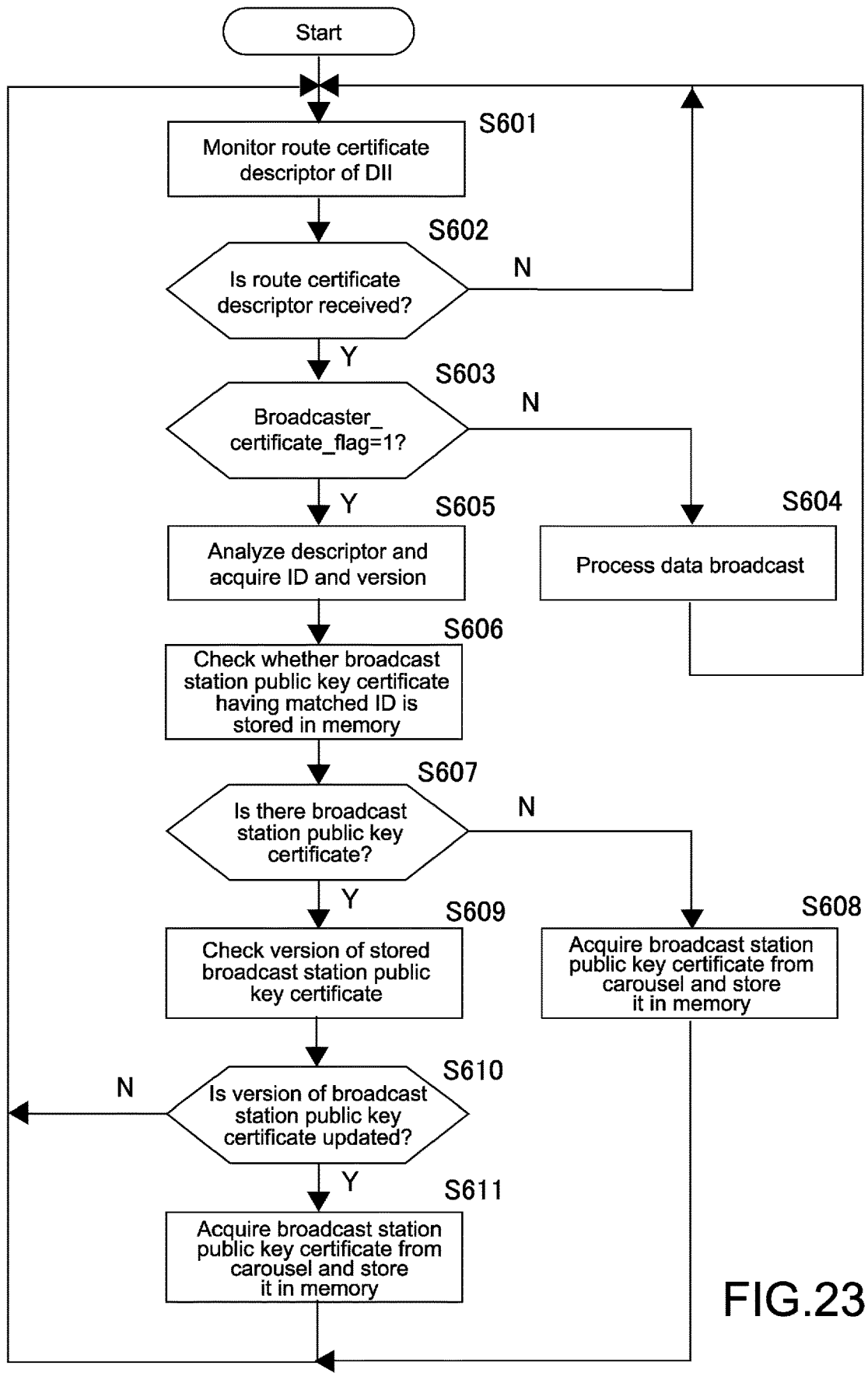
FIG. 23 is a flowchart on the acquisition and update of the broadcast station public key certificate by the data broadcast extending system (Part 2).

FIG. 23 is a flowchart on the acquisition and update of the broadcast station public key certificate by the data broadcast extending system (Part 2).

First, the application controller 708 of the information processing apparatus 700 monitors a route certificate descriptor of a DII transmitted by data carousel (Step S601). Upon detection of the route certificate descriptor of the DII (Y of Step S602), the application controller 708 of the information processing apparatus 700 analyzes the route certificate descriptor and checks the value of the flag (broadcaster_certificate_flag). When the value of the flag is "0", the application controller 708 processes data broadcast (Step S604), and returns to a state of monitoring the route certificate descriptor of the DII.

When the value of the flag is "0", the application controller 708 extracts an ID and a version of a broadcast station public key certificate from a predetermined storage area, among a plurality of storage areas capable of transmitting a public key certificate directed to data broadcast in the route certificate descriptor (Step S605). The subsequent operations from Step S606 to Step S611 are the same as those of Step S404 to Step S409 in the dedicated module system, and thus description thereof will be omitted.

In such a manner, the information processing apparatus 700 can acquire one or more types of the latest versions of broadcast station public key certificates with different IDs and store those broadcast station public key certificates in the memory.

(Effects Etc. of First Embodiment)

The following effects are obtained in this embodiment.

1. The application controller 708 controls the usage range of a broadcast resource by a broadcast-excluding managed application based on the external application control descriptor of a section AIT. This operation allows an achievement of a system in which the range of usage permission information, which is set for an XML-AIT created by a third party such as a provider of a broadcast-excluding managed application, can be dynamically changed by a broadcast station side using a section AIT.

With this operation, for example, in broadcast programs whose time schedules are fluid, such as relay broadcast of sports, the control of the operation of a broadcast-excluding managed application can be changed in accordance with a change in the progress of a program or a programming change.

Further, the control of the operation of a broadcast-excluding managed application, in which broadcast resources of a plurality of channels (broadcast stations) are assumed to be used, can be specified for each broadcast station.

2. The application controller 708 holds a permission bitmap, which is binary data of service usage permission information of an XML-AIT, in the memory. The application controller 708 can calculate a difference by comparing, by a binary calculation, the permission bitmap held in the memory with the permission bitmap in a section AIT acquired after the broadcast-excluding managed application is activated. This allows the application controller 708 of the information processing apparatus 700 to reduce its load and operate at high speed.

3. The application controller 708 controls a display position on the display screen of a broadcast-excluding managed application based on the external application control descriptor of a section AIT. This operation allows an achievement of a system in which the range of usage permission information, which is set for an XML-AIT created by a third party such as a provider of a broadcast-excluding managed application, can be dynamically changed by a broadcast station side using a section AIT.

Modified Example 1

In the first embodiment, an electronic signature is attached to an application, but an electronic signature may be attached to an XML-AIT. By this system, in the case where a plurality of broadcast stations permit one application to use a broadcast resource, electronic signatures of all broadcast stations that permit the use of a broadcast resource are attached to an XML-AIT.

Modified Example 2

The system in Modified Example 1 does not allow a falsification of an application to be directly detected. In this regard, a hash value of an application is embedded in an XML-AIT, and in the information processing apparatus 700, a hash value calculated from the substance of an application is compared with the hash value embedded in the XML-AIT and notified. This allows a falsification of an application to be indirectly detected. Hereinafter, this system will be described.

Next, the generation and verification of an electronic signature and a hash value will be described.

FIG. 24 is a diagram for describing a system of the generation and verification of an electronic signature and a hash value.

A server includes a signed AIT generation unit 350A. Specifically, the signed AIT generation unit 350A is achieved by a program loaded to the main memory and used for generating an electronic signature and a hash value, and a CPU that executes the program.

The signed AIT generation unit 350A uses a predetermined hash calculator 352A to calculate a hash value 353A from the substance (binary code) of a broadcast-excluding managed application 351A. As a hash algorithm, for example, an SHA-1, an SHA-2, and the like that are standardized in FIPS PUB 180-1 and 180-2 are exemplified.

The signed AIT generation unit 350A combines the hash value 353A with an XML-AIT 362A of the broadcast-excluding managed application 351A and generates an XML-AIT 355A with a hash value.

The application creator requests a broadcast station 100A to authenticate the broadcast-excluding managed application 351A and the XML-AIT 355A.

The broadcast station 100A reviews the content of the broadcast-excluding managed application 351A and the XML-AIT 355A, which are authentication targets requested by the application creator. If there are no problems, the broadcast station 100A sets, of a pair of a secret key issued by a route CA 800 (FIG. 1) and a broadcast station public key certificate, the secret key to be a signature generation key 357A in a signature generator 356A. The signature generator 356A uses a hash function for a signature for the XML-AIT 355A to generate a digest, encrypts the digest with the signature generation key (secret key) 357A, and generates an XML signature 358A. The broadcast station 100A responds to the server by providing the generated XML signature 358A.

The signed AIT generation unit 350A of the server adds the XML signature 358A, which is provided as a response by the broadcast station 100A, to the XML-AIT 355A with a hash value, generates an XML-AIT 360A with an electronic signature, and delivers the XML-AIT 360A with an electronic signature to the information processing apparatus 700A.

The application controller 708A of the information processing apparatus 700A uses a predetermined hash calculator 751A (hash function) to calculate a hash value 752A from the substance (binary code) of the broadcast-excluding managed application 351A acquired from the server. The hash function used here has to be the same as that of the hash calculator 352A of the signed AIT generation unit 350A of the server. So, the application controller 708A checks a hash algorithm described in the XML-AIT 360A with an electronic signature acquired from the server and determines whether the hash algorithm has a consistency with the hash algorithm of the hash calculator 751A (hash function). If the inconsistency of the hash algorithm is determined, the application controller 708A switches the hash calculator 751A (hash function) to cause the hash algorithm to be consistent with that of the hash calculator 352A of the signed AIT generation unit 350A of the server.

The application controller 708A uses a hash comparator 756A to compare the hash value 353A, which is extracted from the XML-AIT 360A with an electronic signature acquired from the server, with the hash value 752A, and obtains a result of value consistency/inconsistency 757A.

The application controller 708A extracts the XML signature from the XML-AIT 360A with an electronic signature, which is acquired from the server, in a signature validator 753A. The application controller 708A uses a signature validation key (public key) 754A to verify the XML signature and obtains a signature validation result 755A.

According to this modified example, since the hash value is added to the application and provided to the information processing apparatus 700, the information processing apparatus 700 can determine the correctness of the application by comparing the hash value calculated for the application acquired from the application server 300 with the hash value transmitted by the XML-AIT.

Hereinabove, the embodiment in which the standard of the HbbTV is assumed has been described, but the present technology is not limited to the assumption of the standard of the HbbTV.

(Other Configurations of Present Technology)

The present technology can have the following configurations.

(1) An information processing apparatus, including:
a broadcast receiving unit configured to be capable of a receiving broadcast; and
a controller configured
to acquire a first application information table by communication, the first application information table storing at least first usage permission information indicating a usage permission range of a resource of the broadcast by an application using the resource, to control an operation of the application, and
to acquire a second application information table storing at least second usage permission information indicating the usage permission range of the resource by the application by using the broadcast receiving unit during execution of the application, to control the operation of the application.

(2) The information processing apparatus according to (1), in which the controller is configured to acquire the application based on information of the first application information table and activate the acquired application.

(3) The information processing apparatus according to (1) or (2), in which when a difference is detected by comparing the first usage permission information with the second usage permission information, the controller is configured to switch from the first usage permission information to the second usage permission information, to control a usage range of the resource by the application.

(4) The information processing apparatus according to any one of (1) to (3), in which the application includes an application provided by a third party excluding a broadcast station.

(5) The information processing apparatus according to any one of (1) to (4), in which each of the first application information table and the second application information table is configured to store area information that defines an area on a display screen, the area allowing the application to be displayed therein, and the controller is configured to set the area based on the area information and display the application in the area.

(6) A broadcast apparatus, including a broadcast unit configured to transmit a broadcast signal containing an application information table, the application information table storing at least usage permission information indicating a usage permission range of a broadcast resource by an application capable of using the broadcast resource.

(7) The broadcast apparatus according to (6), in which the broadcast unit is configured to store area information in the application information table for transmission, the area information defining an area on a display screen, the area allowing the application to be displayed therein.

(8) An information processing system, comprising:

circuitry configured to receive a broadcast;

acquire a first application information table via a communication network, the first application information table storing at least first usage permission information indicating a first usage permission range of a broadcast resource by an application when using the broadcast resource; and acquire a second application information table via a broadcast network, different from the communication network, to control the operation of the application, the second application information table storing at least second usage permission information indicating a second usage permission range of the broadcast resource by the application during execution of the application.

(9) The information processing system according to (8), wherein the circuitry is configured to acquire the application based on information of the first application information table and to activate the acquired application.

(10) The information processing system according to (8) or (9), wherein, when a difference is detected as a result of comparing the first usage permission information to the second usage permission information, the circuitry switches from the first usage permission information to the second usage permission information to control a usage range of the broadcast resource by the application.

(11) The information processing system according to any one of (8) to (10), wherein the application is provided by a third party excluding a broadcast station that broadcasts the second application information table over the broadcast network.

(12) The information processing system according to any one of (8) to (11), wherein each of the first application information table and the second application information table is configured to store area information that defines an area on a display screen, the area allowing graphics associated with the application to be displayed therein, and wherein the circuitry is configured to set the area based on the area information and display the graphics associated with the application in the area.

(13) A transmission system, comprising:

circuitry configured to transmit a signal containing an application information table, the application information table storing at least usage permission information indicating a usage permission range of a broadcast resource by an application for when the application uses the broadcast resource.

(14) The transmission system according to (13), wherein the circuitry is configured to store area information in the application information table for transmission, the area information defining an area on a display screen, the area allowing graphics associated with the application to be displayed therein.

(15) A receiving method, comprising:

acquiring, using a controller, a first application information table via a communication network, the first application information table storing at least first usage permission information indicating a first usage permission range of a broadcast resource by an application when using the broadcast resource; and acquiring, using the processor, a second application information table via a broadcast network, different from the communication network, to control the application during execution of the application, the second application information table storing at least second usage permission information indicating a second usage permission range of the resource by the application.

(16) The information processing system according to any one of (8) to (12), wherein the circuitry is configured to activate the acquired application prior to acquiring the second application information table.

(17) The information processing system according to any one of (8) to (12) or (16), wherein the circuitry is configured to store the first usage permission information in memory, and wherein the first usage permission information includes a permission bitmap.

(18) The information processing system according to any one of (8) to (12) or (16) to (17), wherein the first usage permission information includes a permission specifying unit indicating the first usage permission range, the permission specifying unit including one or more selected from the group consisting of: all, affiliate, broadcaster, service, even, and series.

(19) The information processing system according to any one of (8) to (12) or (16) to (18), wherein the first usage permission information is included in a usage permission information descriptor in the first application information table, along with overlay area information.

(20) The information processing system according to any one of (8) to (12) or (16) to (19), wherein the overlay area information defines an overlay area, the overlay area being an area on a display screen in which the application is displayed.

(21) The information processing system according to any one of (8) to (12) or (16) to (20), wherein the first usage permission range is different from the second usage permission range.

(21) The transmission system according to (13), wherein the signal is transmitted via broadcast over a broadcast network.

(22) The transmission system according to (13), wherein the signal is transmitted wirelessly.

(23) The receiving method according to (15), further comprising:

activating, using the processor, the acquired application prior to acquiring the second application information table; and storing the first usage permission information in memory.

(24) The receiving method according to either (15) or (23), wherein the first usage permission information is included in a usage permission information descriptor in the first application information table, along with overlay area information, and wherein the overlay area information defines an overlay area, the overlay area being an area on a display screen in which the application is displayed.

(25) The receiving method according to any one of (15), (23), or (24), wherein the first usage permission range is different from the second usage permission range.

In addition to the above, the present technology is not limited to the above-mentioned embodiment and can be variously modified without departing from the gist of the present invention as a matter of course.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST 10 information processing system
21 usage permission information descriptor
41 common descriptor area
51 permission bitmap
100 broadcast station
200 first network
300 application server
400 AIT server
500 edge router
600 second network
700 information processing apparatus
701 broadcast interface
702 demultiplexer
703 output processing unit
704 video decoder
705 voice decoder
706 subtitle decoder
707 communication interface
708 application controller

The invention claimed is:

1. An information processing system, comprising:
circuitry configured to
receive a broadcast;
acquire a first application information table via a communication network, the first application information table storing at least first usage permission information indicating a first usage permission range of a broadcast resource by an application when using the broadcast resource, wherein the first usage permission information comprises a first permission bitmap included within the first application information table;
acquire the application based on information of the first application information table and activate the acquired application;
acquire a second application information table via a broadcast network, different from the communication network, to control an operation of the application, the second application information table storing at least second usage permission information indicating a second usage permission range of the broadcast resource by the application during execution of the application, wherein the second usage permission information comprises a second permission bitmap included within the second application information table;
control the operation of the application in accordance with the first application information table between acquiring the first application information table and acquiring the second application information table; and
control the operation of the application in accordance with the second application information table after acquiring the second application information table, wherein
at least one of the first application information table and the second application information table includes information on a behavior to be carried out by the information processing system at a time of a permission error, the information on the behavior specifying a response to the permission error and including one selected from the group consisting of (i) hiding display of the application, (ii) hiding display of a video of the broadcast resource, and (iii) hiding the display of the application and suspending an operation of the application, and
when a difference is detected as a result of comparing the first usage permission information to the second usage permission information, the circuitry switches from the first usage permission information to the second usage permission information to control a usage range of the broadcast resource by the application.

2. The information processing system according to claim 1, wherein the application is provided by a third party excluding a broadcast station that broadcasts the second application information table over the broadcast network.

3. The information processing system according to claim 1,
wherein each of the first application information table and the second application information table is configured to store area information that defines an area on a display screen, the area allowing graphics associated with the application to be displayed therein, and
wherein the circuitry is configured to set the area based on the area information and display the graphics associated with the application in the area.

4. A transmission system, comprising:
circuitry configured to transmit a signal containing an application and an application information table, the application information table storing at least usage permission information indicating a usage permission range of a broadcast resource by the application for when the application uses the broadcast resource, wherein the usage permission information comprises a permission bitmap included within the application information table, and wherein the application information table includes information on a behavior to be carried out by an information processing system that receives the signal at a time of a permission error, the information on the behavior specifying a response to the permission error and including one selected from the group consisting of (i) hiding display of the application, (ii) hiding display of a video of the broadcast resource, and (iii) hiding the display of the application and suspending an operation of the application, wherein the application is acquired based on information of the application information table, and when a difference is detected as a result of comparing the usage permission information to another usage permission information, a switch from the usage permission information to the other usage permission information is performed to control a usage range of the broadcast resource by the application.

5. The transmission system according to claim 4, wherein the circuitry is configured to store area information in the application information table for transmission, the area information defining an area on a display screen, the area allowing graphics associated with the application to be displayed therein.

6. A receiving method, comprising:

acquiring, using circuitry, a first application information table via a communication network, the first application information table storing at least first usage permission information indicating a first usage permission range of a broadcast resource by an application when using the broadcast resource, wherein the first usage permission information comprises a first permission bitmap included within the first application information table;

acquiring, using the circuitry, the application based on information of the first application information table and activating the acquired application;

acquiring, using the circuitry, a second application information table via a broadcast network, different from the communication network, to control the application during execution of the application, the second application information table storing at least second usage permission information indicating a second usage permission range of the resource by the application, wherein the second usage permission information comprises a second permission bitmap included within the second application information table;

controlling, using the circuitry, an operation of the application in accordance with the first application information table between acquiring the first application information table and acquiring the second application information table; and controlling, using the circuitry, the operation of the application in accordance with the second application information table after acquiring the second application information table, wherein at least one of the first application information table and the second application information table includes information on a behavior to be carried out by the circuitry at a time of a permission error, the information on the behavior specifying a response to the permission error and including one selected from the group consisting of (i) hiding display of the application, (ii) hiding display of a video of the broadcast resource, and (iii) hiding the display of the application and suspending an operation of the application, and when a difference is detected as a result of comparing the first usage permission information to the second usage permission information, the first usage permission information is switched by the circuitry to the second usage permission information to control a usage range of the broadcast resource by the application.

7. The information processing system according to claim 1, wherein the circuitry is configured to activate the acquired application prior to acquiring the second application information table.

8. The information processing system according to claim 1, wherein the circuitry is configured to store the first usage permission information in memory.

9. The information processing system according to claim 1, wherein the first usage permission information includes a permission specifying unit indicating the first usage permission range, the permission specifying unit including one or more selected from the group consisting of: all, affiliate, broadcaster, service, event, and series.

10. The information processing system according to claim 1, wherein the first usage permission information is included in a usage permission information descriptor in the first application information table, along with overlay area information.

11. The information processing system according to claim 10, wherein the overlay area information defines an overlay area, the overlay area being an area on a display screen in which the application is displayed.

12. The information processing system according to claim 1, wherein the first usage permission range is different from the second usage permission range.

13. The transmission system according to claim 4, wherein the signal is transmitted via broadcast over a broadcast network.

14. The transmission system according to claim 4, wherein the signal is transmitted wirelessly.

15. The receiving method according to claim 6, further comprising:

activating, using the circuitry, the acquired application prior to acquiring the second application information table; and storing the first usage permission information in memory.

16. The receiving method according to claim 6, wherein the first usage permission information is included in a usage permission information descriptor in the first application information table, along with overlay area information, and wherein the overlay area information defines an overlay area, the overlay area being an area on a display screen in which the application is displayed.

17. The receiving method according to claim 6, wherein the first usage permission range is different from the second usage permission range.

* * * * *